(12) United States Patent
Shmilovich et al.

(10) Patent No.: US 10,526,072 B2
(45) Date of Patent: Jan. 7, 2020

(54) ACTIVE FLOW CONTROL SYSTEMS AND METHODS FOR AIRCRAFT

(71) Applicant: The Boeing Company, Chicago, IL (US)

(72) Inventors: Arvin Shmilovich, Huntington Beach, CA (US); Yoram Yadlin, Irvine, CA (US); Paul Vijgen, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/396,177

(22) Filed: Apr. 26, 2019

(65) Prior Publication Data

US 2019/0248475 A1 Aug. 15, 2019

Related U.S. Application Data

(63) Continuation-in-part of application No. 15/234,702, filed on Aug. 11, 2016, now Pat. No. 10,308,350.

(51) Int. Cl.
*B64C 21/04* (2006.01)
*B64C 23/06* (2006.01)
(Continued)

(52) U.S. Cl.
CPC .............. *B64C 23/065* (2013.01); *B64C 9/38* (2013.01); *B64C 21/04* (2013.01); *B64C 21/08* (2013.01);
(Continued)

(58) Field of Classification Search
CPC ........... B64C 21/04; B64C 21/02; B64C 9/38; B64C 21/08
See application file for complete search history.

(56) References Cited

U.S. PATENT DOCUMENTS

| 2,868,480 | A | * | 1/1959 | Attinello | ............... B64C 23/005 244/207 |
| RE24,917 | E | * | 12/1960 | Attinello | ............... B64C 23/005 244/207 |

(Continued)

FOREIGN PATENT DOCUMENTS

WO 2011076427 6/2011

OTHER PUBLICATIONS

European Patent Office, "Extended European Search Report," issued in connection with European Patent Application No. 17185632.1, dated Oct. 6, 2017, 11 pages.

(Continued)

*Primary Examiner* — Justin M Benedik
(74) *Attorney, Agent, or Firm* — Hanley, Flight & Zimmerman, LLC

(57) ABSTRACT

Example active flow control systems and methods for aircraft are described herein. An example active flow control system includes a plurality of nozzles arranged in an array across a surface of an aircraft. The nozzles are oriented to eject air across the surface to reduce airflow separation. The active flow control system also includes an air source coupled to the nozzles and a controller to activate the nozzles to eject air from the air source in sequence from outboard to inboard and then from inboard to outboard to create a wave of air moving from outboard to inboard and then from inboard to outboard across the surface.

20 Claims, 15 Drawing Sheets

(51) Int. Cl.
*B64C 9/38* (2006.01)
*G05D 7/06* (2006.01)
*B64C 21/08* (2006.01)

(52) U.S. Cl.
CPC ........ *G05D 7/0664* (2013.01); *B64C 2230/04* (2013.01); *B64C 2230/06* (2013.01)

(56) References Cited

U.S. PATENT DOCUMENTS

| | | | | |
|---|---|---|---|---|
| 3,581,995 A | * | 6/1971 | Fischer | B64C 9/38 239/265.19 |
| 3,724,784 A | * | 4/1973 | Von Ohain | B64C 23/005 244/207 |
| 3,841,588 A | * | 10/1974 | Arnold | B64C 23/005 244/207 |
| 3,887,146 A | * | 6/1975 | Bright | B64C 29/00 244/12.1 |
| 3,893,638 A | * | 7/1975 | Kelley | B64C 15/00 244/12.5 |
| 3,920,203 A | * | 11/1975 | Moorehead | B64C 21/04 244/207 |
| 4,019,696 A | * | 4/1977 | Hirt | B64C 21/00 244/200.1 |
| 4,391,424 A | * | 7/1983 | Bartoe, Jr. | B64C 9/32 244/110 B |
| 4,392,621 A | * | 7/1983 | Viets | B64C 9/38 137/829 |
| 4,447,028 A | * | 5/1984 | Wang | B64C 9/00 244/207 |
| 4,600,172 A | * | 7/1986 | Loth | B64C 21/04 244/207 |
| 4,645,140 A | * | 2/1987 | Bevilaqua | B64C 21/04 239/265.11 |
| 4,674,717 A | * | 6/1987 | Loebert | B64C 21/04 244/207 |
| 5,062,588 A | * | 11/1991 | Garland | B64C 29/0066 244/12.4 |
| 5,806,808 A | * | 9/1998 | O'Neil | B64C 9/22 244/201 |
| 6,109,565 A | * | 8/2000 | King, Sr. | B64C 3/141 244/12.1 |
| 6,682,021 B1 | * | 1/2004 | Truax | B64C 23/06 138/38 |
| 6,926,229 B2 | * | 8/2005 | Cummings | B64C 15/02 244/12.5 |
| 7,635,107 B2 | | 12/2009 | Shmilovich et al. | |
| 8,087,618 B1 | * | 1/2012 | Shmilovich | B64C 9/38 244/198 |
| 8,336,828 B2 | | 12/2012 | Shmilovich et al. | |
| 8,382,043 B1 | | 2/2013 | Raghu | |
| 8,632,031 B2 | | 1/2014 | Shmilovich et al. | |
| 9,108,725 B1 | * | 8/2015 | Shmilovich | B64C 21/04 |
| 9,371,132 B2 | | 6/2016 | Shmilovich et al. | |
| 2006/0102801 A1 | * | 5/2006 | Manley | B64C 21/04 244/208 |
| 2007/0034746 A1 | * | 2/2007 | Shmilovich | B64C 9/16 244/207 |
| 2011/0108672 A1 | * | 5/2011 | Shmilovich | B64C 9/18 244/207 |
| 2012/0001028 A1 | * | 1/2012 | Frey | B64C 9/16 244/208 |
| 2012/0256049 A1 | * | 10/2012 | Shmilovich | B64C 9/38 244/1 N |
| 2014/0091180 A1 | | 4/2014 | Shmilovich et al. | |
| 2014/0119878 A1 | * | 5/2014 | Shmilovich | B64C 21/04 415/1 |
| 2018/0043995 A1 | | 2/2018 | Shmilovich et al. | |

OTHER PUBLICATIONS

European Patent Office, "Communication Pursuant to Article 94(3) EPC", issued in connection with European Application No. 17185632.1 dated Mar. 20, 2019, 6 pages.

United States Patent and Trademark Office, "Non-Final Office Action" issued in connection with U.S. Appl. No. 15/234,702, 26 pages.

United States Patent and Trademark Office, "Notice of Allowance and Fee(s) Due" issued in connection with U.S. Appl. No. 15/234,702, 18 pages.

European Patent Office, "Extended European Search Report," issued in connection with European Patent Application No. 17185632.1, dated Oct. 9, 2019, 7 pages.

* cited by examiner

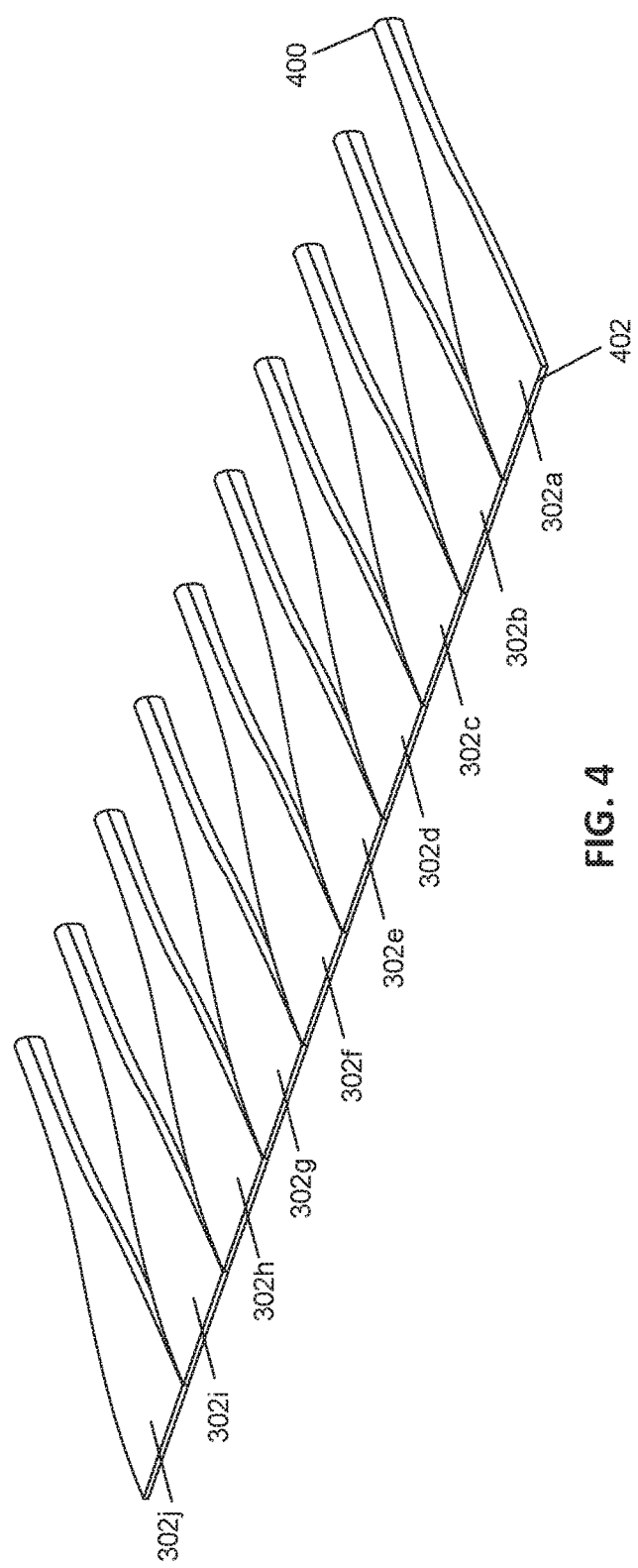
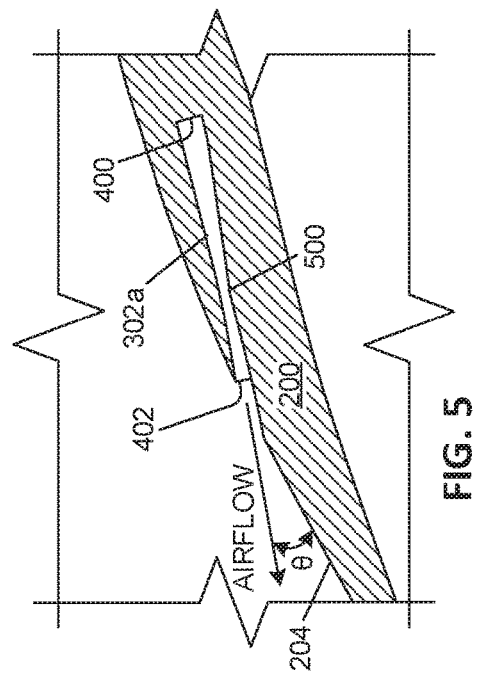

ACTIVE FLOW CONTROL SYSTEMS AND METHODS FOR AIRCRAFT

RELATED APPLICATION

This patent arises from a continuation-in-part of U.S. application Ser. No. 15/234,702, titled "Active Flow Control Systems and Methods for Aircraft," filed Aug. 11, 2016, which is hereby incorporated by reference in its entirety.

FIELD OF THE DISCLOSURE

This disclosure relates generally to aircraft and, more particularly, to active flow control systems and methods for aircraft.

BACKGROUND

Aircraft employ movable control surfaces to affect the aerodynamic lift of the aircraft. Control surfaces may include, for example, flaps, slats, ailerons, etc. When a control surface such as a flap is deployed, the airflow over the top of the wing separates from the airflow along the bottom of the wing and reattaches downstream of the wing. However, the airflow over the top of the wing does not follow the entire upper surface of the wing and control surface. Instead, the airflow detaches or separates from the upper surface of the wing and control surface and a separation pocket or deadzone is created behind the control surface. This separation pocket produces drag and decreases the lift generated by the wing.

SUMMARY

An example method disclosed herein includes supplying pressurized air to a plurality of nozzles. The nozzles are arranged in an array across a control surface of an aircraft, and the nozzles are oriented to eject the pressurized air in a substantially streamwise direction. The example method also includes activating the nozzles to eject the pressurized air in sequence to create a wave of air moving in a spanwise direction across the control surface.

An example apparatus disclosed herein includes a plurality of nozzles arranged in an array across a control surface of an aircraft. The nozzles are oriented to eject air in a substantially streamwise direction. The example apparatus also includes an air supply coupled to the nozzles and a controller to activate the nozzles to eject air in sequence to create a wave of air moving in a spanwise direction across the control surface.

An example active flow control system disclosed herein includes a plurality of nozzles arranged in an array across a surface of an aircraft. The nozzles are oriented to eject air across the surface to reduce airflow separation. The active flow control system includes an air source coupled to the nozzles and a controller to activate the nozzles to eject air from the air source in sequence from outboard to inboard and then from inboard to outboard to create a wave of air moving from outboard to inboard and then from inboard to outboard across the surface.

An example method disclosed herein includes supplying pressurized air to a plurality of nozzles. The nozzles are arranged in an array across a surface of an aircraft. The nozzles are oriented to eject air across the surface to reduce airflow separation. The example method includes activating the nozzles to eject the pressurized air in sequence from outboard to inboard and then from inboard to outboard to create a wave of air that moves from outboard to inboard and then from inboard to outboard across the surface.

An example active flow control system disclosed herein includes a plurality of nozzles arranged in an array across a surface of an aircraft. The nozzles are oriented to eject air in a substantially streamwise direction. The example active flow control system also includes an air source coupled to the nozzles and a control system to: activate the nozzles to eject air from the air source in sequence to create a wave of air moving across the surface, and control an exit velocity of each of the nozzles such that the exit velocities of the nozzles are different.

BRIEF DESCRIPTION OF THE DRAWINGS

FIG. 4 illustrates an example array of nozzles of the example active flow control system of FIG. 3.

FIG. 5 is a cross-sectional view of the control surface of FIG. 3 and one of the example nozzles of FIG. 4 taken along line A-A of FIG. 3.

Figure 1:
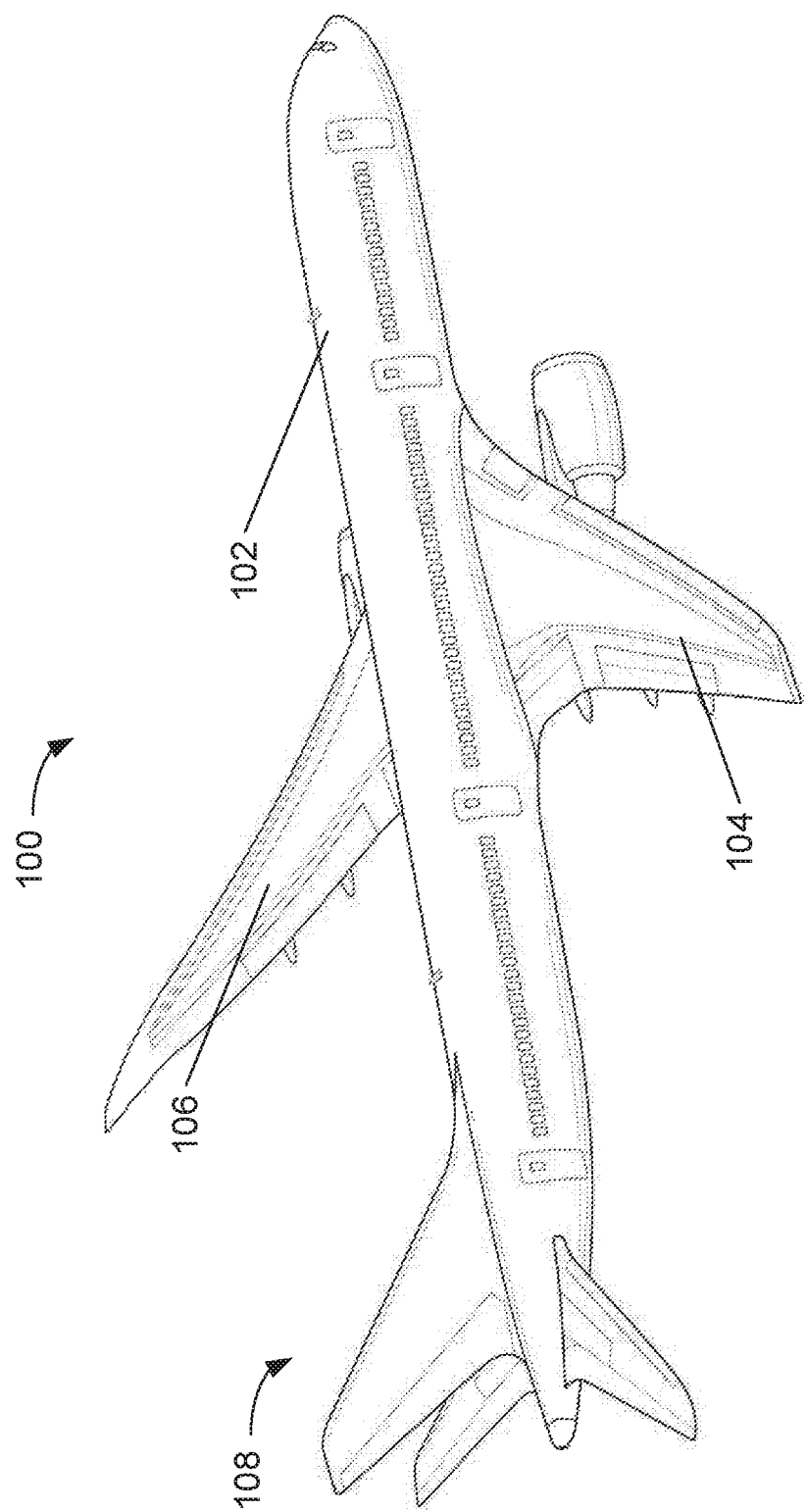
FIG. 1 illustrates an example aircraft in which the example active flow control systems and methods disclosed herein may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft employ movable control surfaces to affect the aerodynamic lift of the aircraft. Control surfaces may include, for example, flaps, slats, ailerons, etc. In some situations, when a control surface is deployed, the airflow over the wing does not follow the entire upper surface of the wing and control surface. Specifically, the airflow may separate from the surfaces of the wing and the control surface. As a result, a separation pocket or deadzone is created around the upper surface of the wing or the control surface, which causes flow reversal and/or turbulence in the area behind the wing. Such turbulence and flow reversal increases drag and reduces the amount of lift generated by the wing.

To address the above drawbacks, some known aircraft employ an active flow control system to reduce the airflow separation and turbulence in the wake of the control surface. Known active flow control systems eject high pressure air in a streamwise direction from across the control surface. As used herein, the streamwise direction generally refers to the direction the external air flows across the surfaces of the aircraft while moving (e.g., during flight, take-off, landing, etc). The high pressure air imparts momentum into the wake or area along the upper surface the control surface, which typically has relatively low velocity. By energizing this area, the airflow over the wing remains closer to the skin of the wing and control surface (i.e., reduces the size of the boundary layer) and, thus, decreases the separation or detachment of the airflow from the wing and control surface.

Known active flow control systems provide a continuous flow of air through a slot formed in the control surface and aimed in the streamwise direction (e.g., rearward relative to the aircraft). However, supplying continuous airflow across the control surface requires a significant amount of supply air. In some instances, the supply air is bleed air that is extracted from the engine and, thus, decreases the efficiency of the engine. The larger the amount of bleed air needed, the larger the engine is needed, which increases weight and leads to an increase in gross weight and a decrease in flight efficiency. In other instances, a compressor or Auxiliary Power Unit (APU) is used. However, similar to engine bleed air, relatively large compressors or APUs are needed to produce enough supply air. These large compressors and APUs similarly add weight to the aircraft and decrease the overall flight efficiency. In some instances, the amount of air supply needed renders the system impractical for the aircraft design.

Example methods, apparatus/systems and articles of manufacture are disclosed herein to reduce flow separation around a control surface while using significantly less supply air than known systems. Example active flow control systems disclosed herein include an array of adjacent nozzles disposed in or near a surface of an aircraft, such as a control surface. In some examples, the nozzles are located in the control surface and are exposed via a slot in the control surface. The nozzles are oriented or pointed to eject pressurized air in a substantially streamwise direction to cause airflow reattachment around the corresponding section of the control surface. A valve is coupled to each of the nozzles, and pressurized air is provided to the valves via a high pressure air source. In some examples, the nozzles are converging-diverging nozzles, which accelerate the pressurized air to a relatively high velocity (e.g., supersonic speed). A controller activates the nozzles (by opening the respective valves) sequentially (e.g., in series or order) to create a streamwise ejecting jet that travels in the spanwise direction. In other words, the nozzles are activated to eject the pressurized air in sequence to create a wave of air moving in the spanwise direction across the control surface. As used herein, the term spanwise direction is associated with a span of a control surface, which is the direction that the control surface (or the wing) extends from the fuselage of an aircraft. This cross-flow motion produces momentary and instantaneous flow attachment in the region around the respective wing section and, thus, increases the effectiveness of the control surface.

As the air jet traverses along the control surface, the created effect lingers. In other words, the airflow remains attached over the respective wing segment for a period of time beyond the cessation of the air jet. Further, the wing segment affected is larger than the width of an active nozzle and extends to the trailing edge. However, the airflow eventually begins to separate again. In some examples, the sequence is activated at a frequency or rate based on the characteristic time scale of the airflow. For example, after a nozzle is deactivated, and before full separation occurs, the nozzle is activated again in the next repeating sequence. This continuous actuation results in improved streamlining of the airflow at the control surface. Additionally, it creates an induced ripple effect that helps attach the flow over the outboard wing segment. These effects increase global circulation, which results in greater lift production.

In some examples, the nozzles are activated according to a wave pattern. As used herein, the terms "wave pattern,"

"nozzle activation sequence" or "actuation mode" may be used interchangeably and mean the schedule or sequence for activating and/or deactivating the nozzles of the example active flow control systems. Various example wave patterns disclosed herein may be implemented by the example active flow control systems. One example wave pattern includes activating and deactivating the nozzles one at a time, in order, such that only one of the nozzles is activated at a time. For instance, each nozzle may be activated for a period of time. When one nozzle is deactivated, the next nozzle is activated. The wave pattern may travel from outboard to inboard or from inboard to outboard. In some examples, when the last nozzle is deactivated, the wave pattern repeats starting with the first nozzle. In other examples, the wave pattern may reverse back toward the first nozzle, such that the wave moves back-and-forth (inboard-outboard). In another example wave pattern, multiple nozzles may be activated and deactivated at a time. For example, a relatively wide wave pattern may be implemented where a set (e.g., two or more) of adjacent nozzles are activated at a time. In some examples, multiple waves or groups may be activated simultaneously and separated by an interval. For example, a first wave may be started at the first nozzle and a second wave may be started at the third nozzle, where the waves occurs substantially simultaneously. The first and second waves may be separated by at least one nozzle, for example. The first and second waves may propagate, for example, outboard to inboard.

By selectively activating only certain nozzles at particular times, the example systems and methods use significantly less supply air than known systems that require constant supply air across the entire length of the control surface. For example, the amount of airflow needed to produce the same amount of lift is approximately one-eighth the amount of airflow needed for known systems that require constant supply air. Thus, smaller compressors/APUs and/or less engine bleed air is needed to support the example systems disclosed herein. As a result, the example active flow control systems require significantly less resources and, thus, are more practical for implementing in various aircraft. Additionally, because relatively smaller aircraft engines and/or compressors/APUs are required, the gross weight of the aircraft is decreased, leading to reduced fuel consumption and lower emissions.

Turning now to the figures, FIG. 1 illustrates an example aircraft 100 in which the example methods, systems/apparatus and articles of manufacture disclosed herein may be implemented. In the illustrated example, the aircraft 100 includes a fuselage 102 and a first wing 104 and a second wing 106 that are coupled to the fuselage 102. The first and second wings 104, 106 include movable control surfaces such flaps, slats, ailerons, spoilers, and/or other high lift devices that are located along the leading and trailing edges of the first and second wings 104, 106. Further, control surfaces are also employed on a tail section 108 of the aircraft 100. The control surfaces may be displaced or extended to change the aerodynamic lift of the aircraft 100 (e.g., during take-off or landing). When extended from the first wing 104, for example, a control surface may increase the effective size, camber and/or area of the first wing 104, thereby increasing the lift of the first wing 104. Control surfaces are often used during take-off and landing where relatively large lift coefficients are needed.

Figure 2:
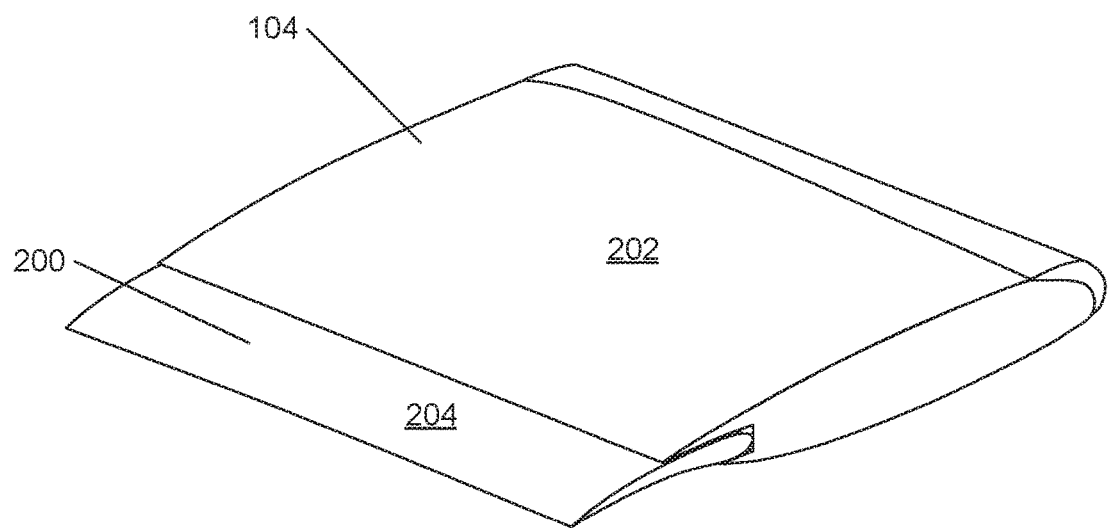
FIG. 2 illustrates an example wing section having an example control surface of the example aircraft of FIG. 1 in a stored position.
Figure 3:
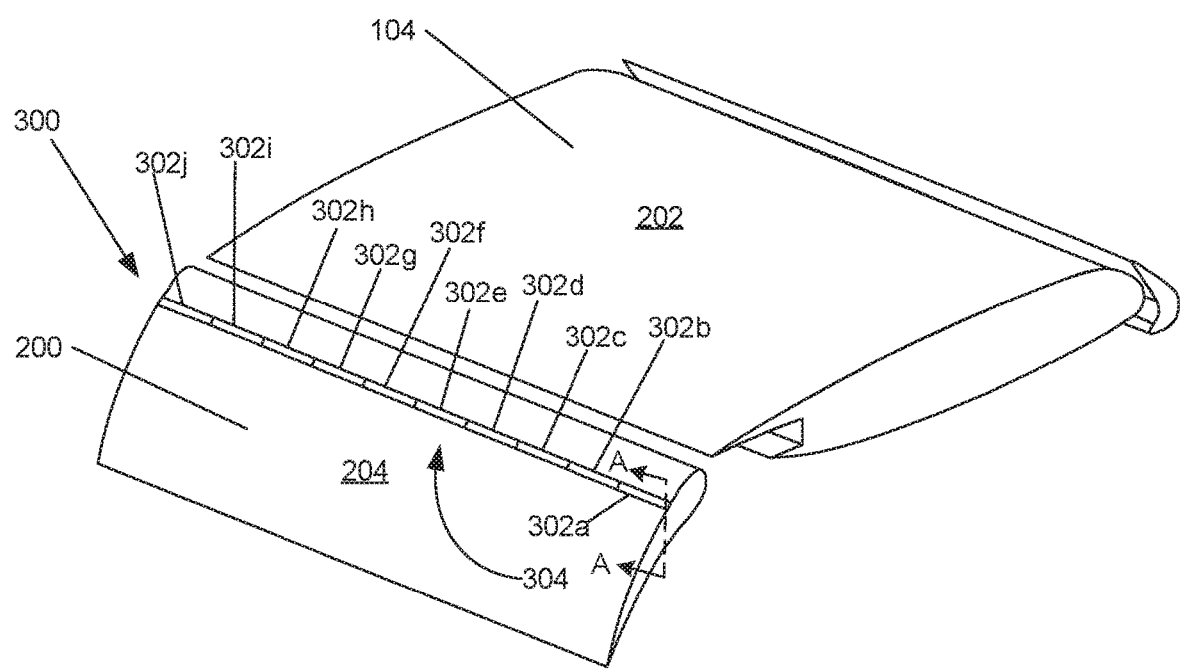
FIG. 3 illustrates the example control surface of FIG. 2 in a deployed position and having an example active flow control system constructed in accordance with the teachings of this disclosure.

FIG. 2 illustrates an example control surface, namely, a flap 200 coupled to the first wing 104 of the aircraft 100 (FIG. 1). In the illustrated example, the flap 200 is movable between a stowed or stored position, as illustrated in FIG. 2, and a deployed or extended position as illustrated in FIG. 3. The flap 200 is often deployed during take-off and landing to change the camber of the first wing 104 and to affect the lift of the aircraft 100. The airflow over an upper surface 202 of the first wing 104 separates from the airflow beneath the first wing 104 and reattaches downstream of the flap 200. When the flap 200 is deployed, the pressure gradient at the flap hinge line triggers flow separation. The decambering of the streamlines reduces global circulation, which limits the lift generated by the first wing 104. As discussed above, this flow separation results in deadzone adjacent an upper surface 204 of the flap 200.

To decrease the separation occurring along the upper surface 204 of the flap 200, an example active flow control system 300 is employed. The active flow control system 300 includes a plurality of nozzles that eject (e.g., dispense) pressurized air in the streamwise direction across the flap 200. In the illustrated example, ten nozzles are employed: a first nozzle 302a, a second nozzle 302b, a third nozzle 302c, a fourth nozzle 302d, a fifth nozzle 302e, a sixth nozzle 302f, a seventh nozzle 302g, an eighth nozzle 302h, a ninth nozzle 302i, and a tenth nozzle 302j. However, in other examples, the active flow control system 300 may employ more or fewer nozzles. In the illustrated example, the nozzles 302a-302j are arranged adjacent to one another in a row or array extending substantially across the length of the flap 200. In other examples, the nozzles 302a-302j may extend across a smaller portion or section of the flap 200. Other control surfaces (e.g., a flap that is outboard of the flap 200, an aileron, an elevator, a rudder, etc.) of the aircraft 100 (FIG. 1) may similarly include an active flow control system 300.

In the illustrated example of FIG. 3, the nozzles 302a-302j are disposed within the flap 200 (e.g., within a front part of the flap) and are exposed via a slot 304 (e.g., an ejection slot, an opening, a slit, etc.) in the upper surface 204 of the flap 200. The slot 304 extends along the flap 200 in the spanwise direction. In the stowed position, as illustrated in FIG. 2, the slot 304 is concealed beneath the upper surface 202 of the first wing 104. However, in the deployed position, as illustrated in FIG. 3, the slot 304 and the nozzles 302a-302j are exposed. In other examples, even when the flap 200 is in the stowed position, some or all of the slot 304 may be exposed. In FIGS. 2 and 3 the active flow control system 300 is shown in connection with the flap 200, which is a flap that moves outward and rearward from the first wing 104. In this example, a small gap may be formed between the flap 200 and the first wing 104. However, it is understood that the active flow control system 300 can similarly be implemented in connection with other types of flaps that have other movement, such as a flap that only rotates about a hinge line. In such an example, no gap may exist between the first wing 104 and the flap.

In the illustrated example, the nozzles 302a-302j are oriented or pointed to eject air in a streamwise direction or a substantially streamwise direction (e.g., ±5 degrees of the streamwise direction) when the flap 200 is deployed. By ejecting air in the substantially streamwise direction, momentum is imparted in the wake behind the flap 200, which causes the airflow over the upper surface 202 of the first wing 104 to remain closer to the upper surface 202 of the first wing 104 and the upper surface 204 of the flap 200 and, thus, reduces separation.

Figure 18:
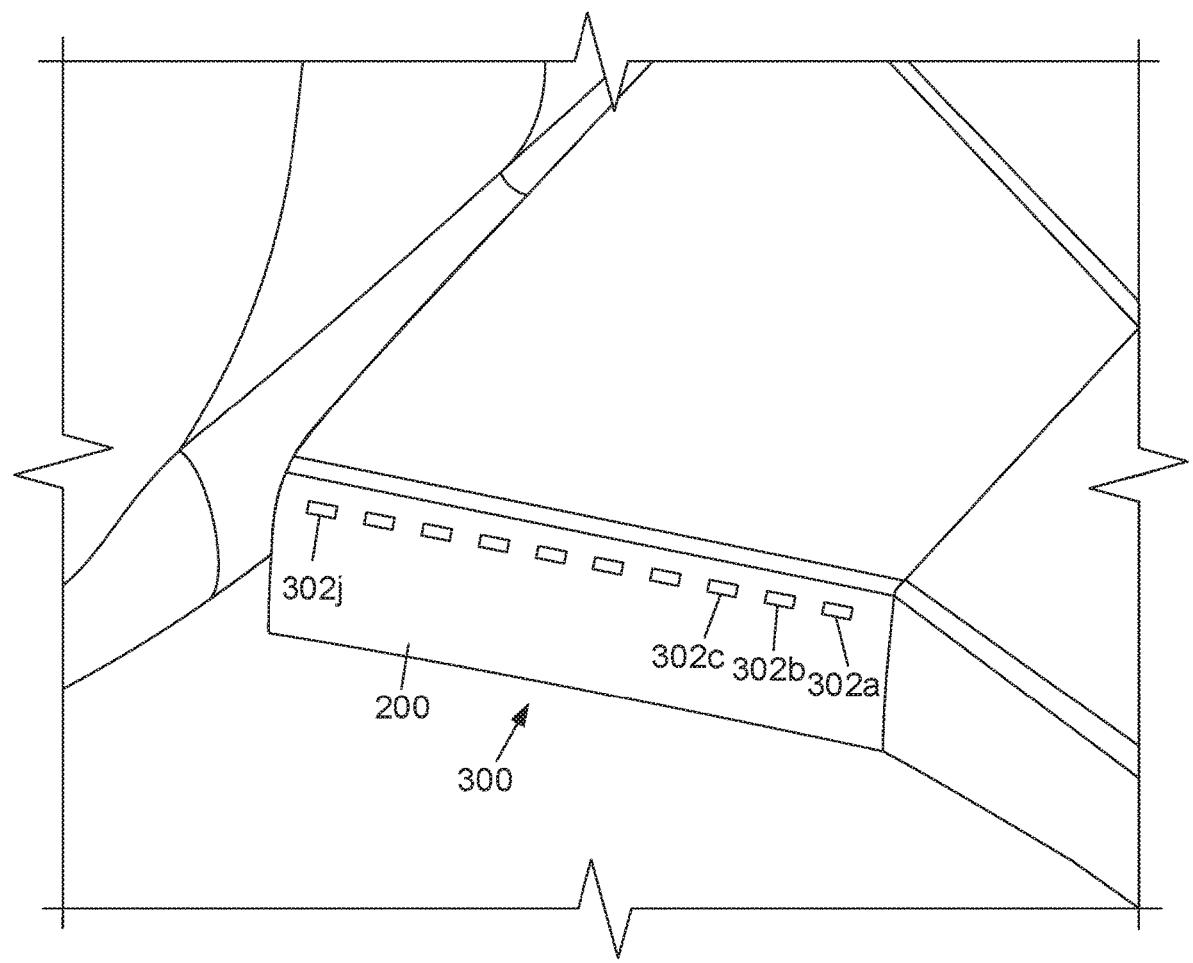
FIG. 18 illustrates the example active flow control system of FIG. 3 having spaced apart nozzles.

While in the illustrated example each of the nozzles 302a-302j is shown as being disposed immediately adjacent another nozzle, in other examples, one or more support structures (e.g., a bracket, a mount, etc.) may be disposed between various ones of the nozzles 302a-302j. In such an example, the nozzles 302a-302j may be spaced further apart from each other. The support structures can be used to provide support and rigidity to the plurality of nozzles 302a-302j as well as the skin (e.g., panels) of the flap 200. An example of spaced apart nozzles is shown in FIG. 18.

FIG. 4 illustrates the example nozzles 302a-302j in isolation (without the flap 200). In the illustrated example, each of the nozzles 302a-302j includes an inlet and an outlet (e.g., an ejector). The outlets of the nozzles 302a-302j are aligned with the slot 304 (FIG. 3) in the flap 200. For example, the first nozzle 302a includes an inlet 400 and an outlet 402. Pressurized air is supplied to the inlet 400 (described in further detail herein) and ejected from the outlet 402. In the illustrated example, the outlet 402 has a flattened elongated shape (e.g., a rectangular shape).

FIG. 5 is a cross-section of the flap 200 and the first nozzle 302a taken along line A-A in FIG. 3. In the illustrated example, the first nozzle 302a is a converging-diverging nozzle (or "CD" nozzle), which provides a high momentum ejection jet. As used herein, a converging-diverging nozzle is a nozzle having a converging section (e.g., a section of converging or decreasing cross-sectional area or width) followed by a diverging section (e.g., a section of diverging or increasing cross-sectional area or width). For example, as illustrated in FIG. 5, the cross-sectional area of the first nozzle 302a decreases or converges from the inlet 400 to a throat 500 (e.g., a minimum area), and then the cross-sectional area increases or diverges from the throat 500 to the outlet 402. The converging-diverging nozzle shape produces relatively fast airflow, similar to a ramjet or rocket. In some examples, the shape ejects the air at supersonic speeds. In the illustrated example of FIG. 4, the other nozzles 302b-302j have substantially the same shape as the first nozzle 302a. In other examples, one or more of the nozzles 302a-302j may have a different shape and/or may be sized differently. For example, one or more of the nozzles 302a-302j may be convergent nozzles.

In some examples, the nozzles 302a-302j are oriented at a relatively shallow angle relative to the upper surface 204 of the flap 200 flap, which enhances Coanda effect. For example, as illustrated in FIG. 5, the first nozzle 302a is oriented to eject airflow at an angle θ relative to the upper surface 204 of the flap 200. In the illustrated example, the angle θ is about 20 degrees (°). In other examples, the angle may be more or less than 20°. In some examples, the nozzles 302a-302j can be oriented at any angle relative to the upper surface 204 between about 5° and 35°.

Figure 6:
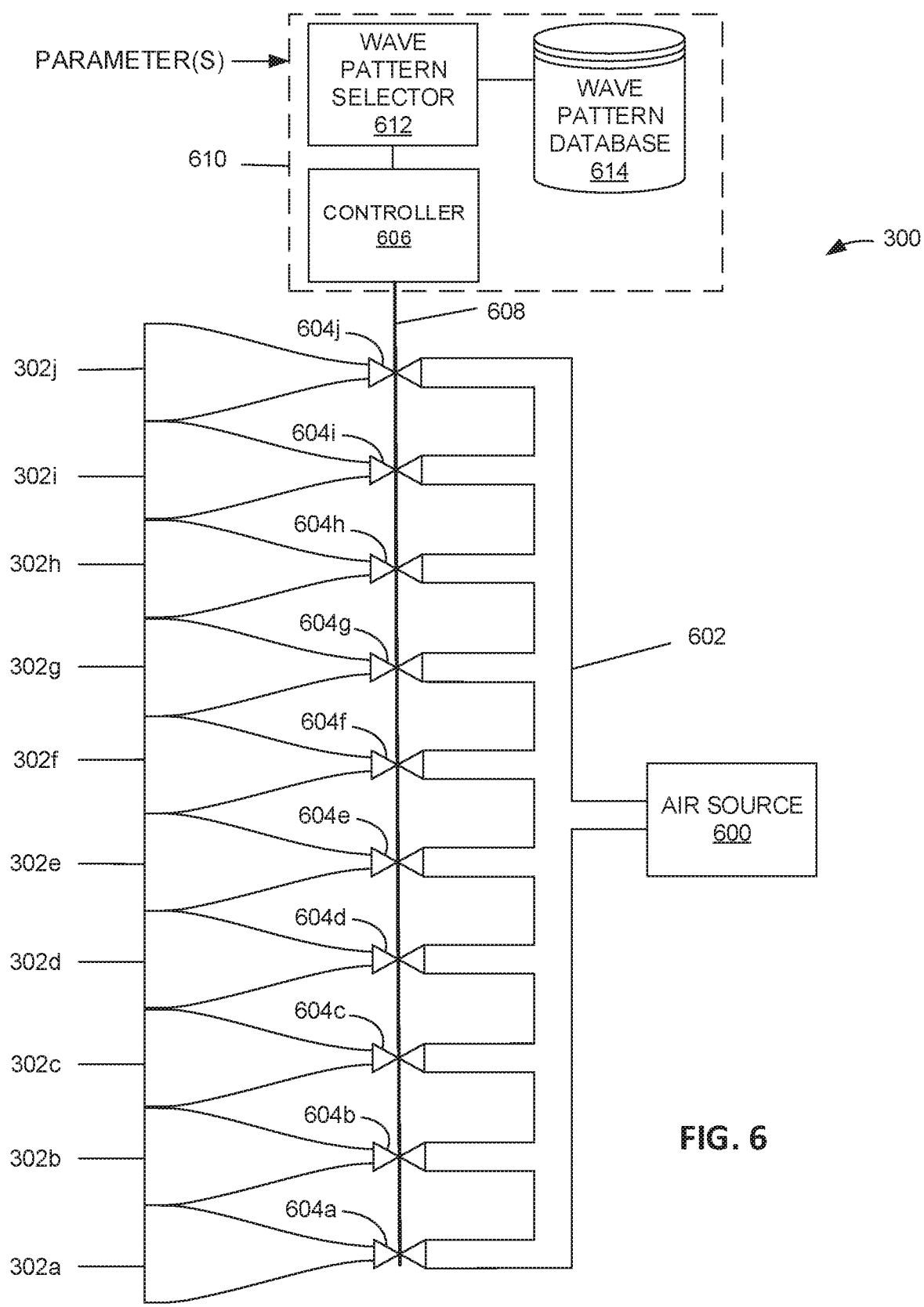
FIG. 6 is a schematic of the example active flow control system of FIG. 3.

FIG. 6 is a schematic of the example active flow control system 300. In the illustrated example, an air source 600 (e.g., an air supply) provides pressurized air to the nozzles 302a-302j via a manifold or piping system 602. In some examples, the air source 600 is bleed air extracted from one or more of the engines of the aircraft 100 (FIG. 1). Additionally or alternatively, in some examples, the air source 600 includes one or more compressors, pressure storage vessels (e.g., an air tank), or APUs. To activate the nozzles 302a-302j, valves 604a-604j are coupled between the piping system 602 and the corresponding nozzle 302a-302j. The valves 604a-604j can be opened or closed to regulate the pressurized air supplied to the respective nozzles 302a-302j. In the illustrated example, the active flow control system 300 includes a controller 606 (referred to herein as the valve controller 606) to control (e.g., operate) the valves 604a-604j. The valve controller 606 is coupled to the valves 604a-604j via a communication line 608, which may include any wired or wireless electronic or pneumatic/hydraulic network. In some examples, multiple air sources are implemented. For example, a plurality of compressors may be implemented, where a compressor may be designated for each of the nozzles 302a-302j. In such an example, activating the nozzles 302a-302j may include activating the compressors for the respective nozzles 302a-302j (in addition to or as an alternative to operating the respective valves 604a-604j).

In some examples, the valve controller 606 activates the nozzles 302a-302j (via the respective valves 604a-604j), simultaneously or individually, according to a wave pattern. In the illustrated example, a control system 610 of the aircraft 100 (FIG. 1) includes the valve controller 606, a wave pattern selector 612 and a wave pattern database 614. The control system 610 may be implemented by one or more processors, such as the processor 2112 disclosed in connection with FIG. 21. In some examples, the wave pattern selector 612 analyzes one or more parameters of flight and selects a wave pattern from the wave pattern database 614 based on the one or more parameters. The parameter(s) may include, for example, an ambient air temperature, an altitude of the aircraft 100 (FIG. 1), a ground speed of the aircraft 100, a relative airspeed of the aircraft 100, an angle or position of the associated control surface (e.g., the flap 200 (FIG. 2)), a weather condition and/or any other flight setting or control surface setting. Additionally or alternatively, one of the parameters may include a measurement from one or more separation sensors that provide(s) an indication of flow separation. Example separation sensors include a skin-friction indicator (e.g., a Preston-tube miniature surface-to-pressure probe) or a flush surface static-pressure orifice. In other examples, the wave pattern selector 612 generates a wave pattern based on the parameter(s).

Figure 7:
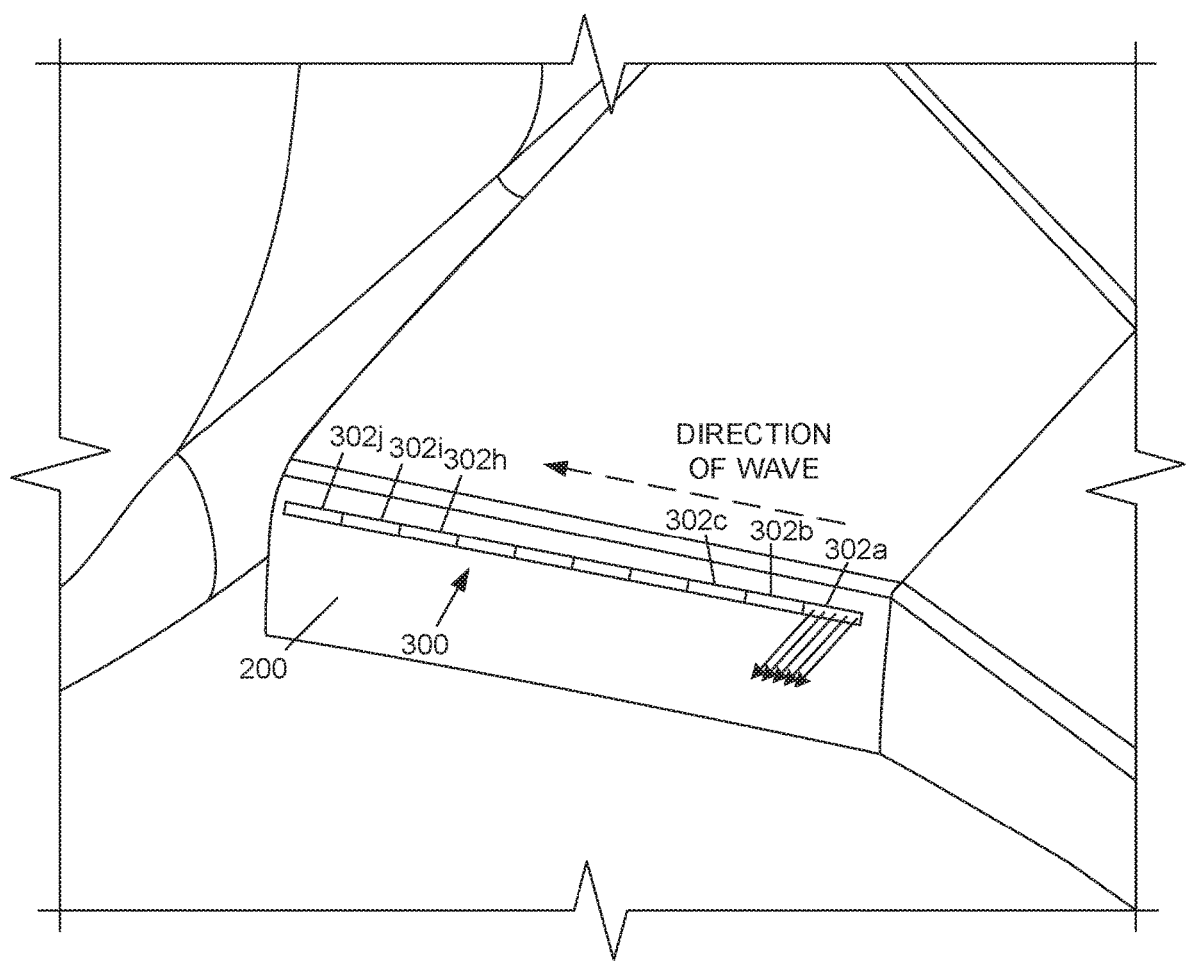
FIG. 7 illustrates an example narrow wave pattern implemented by the example active flow control system of FIG. 3.

FIG. 7 illustrates an example wave pattern, referred to as a narrow wave pattern, that may be implemented by the example active flow control system 300. In the example narrow wave pattern, the nozzles 302a-302j are activated in sequence (e.g., in series or order) to eject pressurized air in the streamwise direction such that a wave of air is created that moves in a spanwise direction (as indicated by the arrow) across the flap 200. In the illustrated example, the wave pattern moves from outboard to inboard. For example, the first nozzle 302a is activated (e.g., by opening the first valve 604a (FIG. 6)), as illustrated by the airflow arrows in FIG. 7. After a period of time, the first nozzle 302a is deactivated and the second nozzle 302b is activated (e.g., by opening the second valve 604b (FIG. 6)). After another period of time, the second nozzle 302b is deactivated and the third nozzle 302c is activated (e.g., by opening the third valve 604c), and so forth. This activation/deactivation process continues across all of the nozzles 302a-302j. In some examples, when the wave pattern reaches the tenth nozzle 302j (e.g., the inner most nozzle), the wave pattern is started again with the first nozzle 302a. The wave pattern may repeat numerous times, as desired. In other examples, the wave pattern may return in the reverse direction, back towards the first nozzle 302a (from inboard to outboard).

In some examples, the rate or frequency at which the wave moves is such that full separation of the airflow from the surface of the flap 200 (e.g., the separation that would otherwise occur without the active flow control system 300) is impeded. For instance, when the first nozzle 302a is activated, the airflow separation is decreased and the airflow over the first wing 104 along the chord of the first nozzle 302a is relatively streamlined. When the first nozzle 302a is deactivated, the streamline effect lingers, but the airflow eventually begins to separate. This transition is not instantaneous, but may occur over a relatively short period of time (e.g., 1 second). Before the flow can fully separate again, the start of the next wave (e.g., a second wave) begins by activating the first nozzle 302a again and, thus, momentum is again imparted into the area behind the flap 200 by the first nozzle 302a. Therefore, the frequency of or rate at which of the wave pattern repeats may be such that it impedes or prevents the airflow from completely separating, which may be referred to as the characteristic time scale of the flow. In some examples, the frequency or rate is determined based on the one or more parameters (FIG. 6). When the airflow over the first wing 104 is relatively fast, for example, the airflow may separate relatively quickly. Thus, a wave pattern with a higher frequency or rate may be implemented to impede full separation.

In some examples, each of the nozzles 302a-302j is activated for a same period of time. For example, each of the nozzles 302a-302j may be activated for 0.1s. In other examples, the periods of time may be different than one another (e.g., the first nozzle 302a is activated for 0.1s and the second nozzle 302b is activated for 0.2 s). In some examples, one nozzle is deactivated at the same moment the next nozzle is activated. In other examples, there may be an overlap during which both nozzles are active or there may be a gap in time in which no nozzles are active. By only activating one (or a subset) of the nozzles 302a-302j at a time, the amount of pressurized air needed is significantly less than the amount of air need when using a constant flow of air as is the case in known systems. Additionally, by using a wave pattern having a frequency or rate that prevents full separation of airflow, the example active flow control system 300 produces substantially the same effect as known systems that employ a constant stream of air. Thus, the example active flow control system 300 achieves substantially the same result while using significantly less pressurized air.

While in some examples the wave pattern may repeat such that each wave moves from outboard to inboard, in other examples, as disclosed herein, the wave pattern may return in the reverse direction, back toward the first nozzle 302a (from inboard to outboard). For example, after the tenth nozzle 302j is activated for a period of time, the tenth nozzle 302j is deactivated, and the ninth nozzle 302i is activated. Then the eight nozzle 302h is activated, and so forth. As such, a return wave is generated that moves in the reverse direction toward the first nozzle 302a. When the wave of air reaches the first nozzle 302a, the wave pattern again reverses and is directed back inboard, and so forth. Therefore, the valve controller 606 activates the nozzles 302a-302j to eject air in sequence from outboard to inboard and then from inboard to outboard (and so forth) to create a wave of air moving from outboard to inboard and then from inboard to outboard across the control surface.

Figure 8:
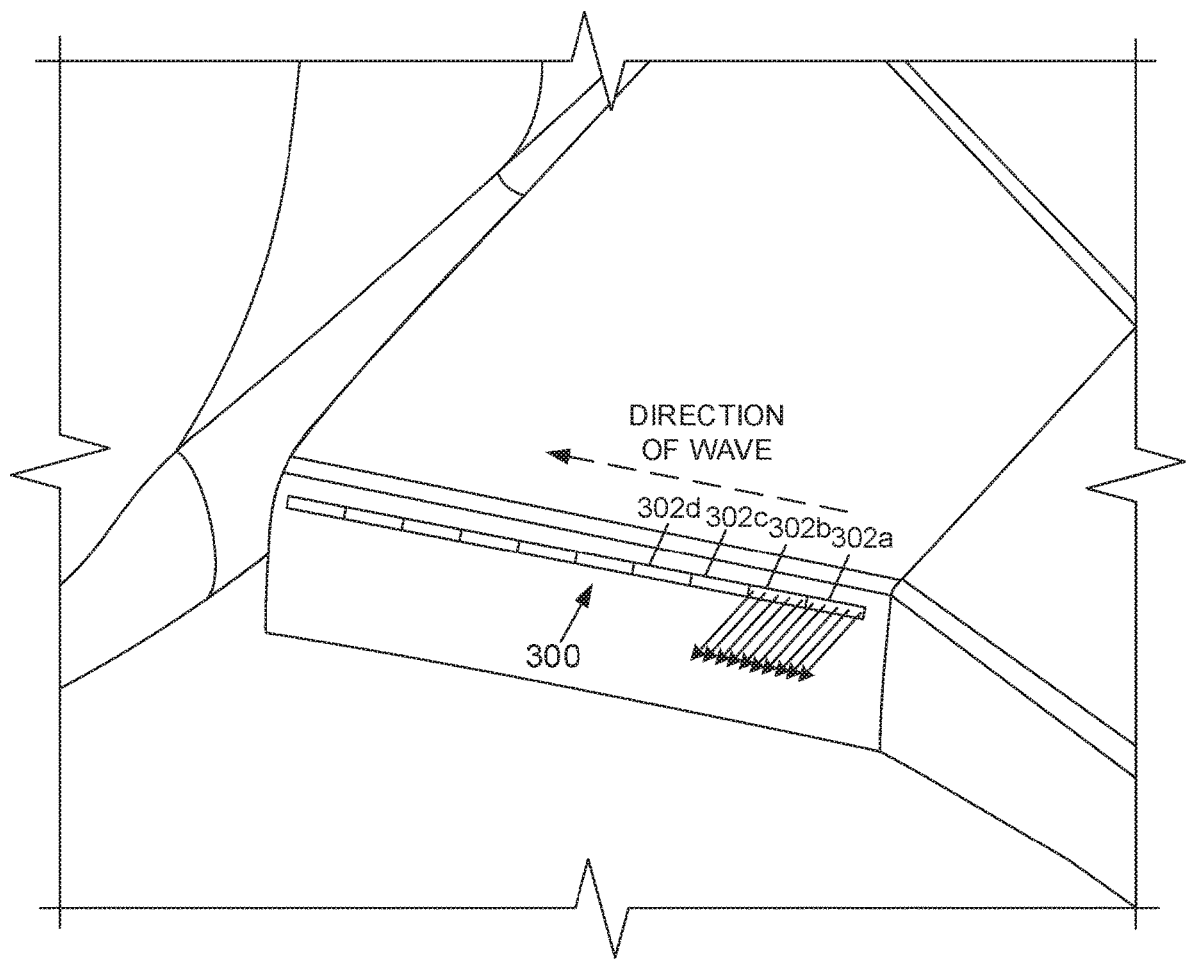
FIG. 8 illustrates an example wide wave pattern implemented by the example active flow control system of FIG. 3.

Another example wave pattern that may be implemented by the example active flow control system 300, referred to as a wide wave pattern, is illustrated in FIG. 8. In a wide wave pattern, two or more adjacent ones of the nozzles 302a-302j are activated at the same time to produce a relatively wide wave (e.g., a wave that is wider than the narrow wave pattern of FIG. 7). For example, the first nozzle 302a and the second nozzle 302b may be activated at the same time. After a period of time, the first nozzle 302a and the second nozzle 302b are deactivated and the third nozzle 302c and the fourth nozzle 302d are activated, and so forth. As such, a relatively wide wave of mass flow propagates from outboard to inboard. In other examples a more continuous actuation pattern may be obtained, for example, where the first nozzle 302a is deactivated and the third nozzle 302c is activated while the second nozzle 302b remains active. Then, after a period of time, the second nozzle 302b is deactivated and the fourth nozzle 302d is activated while the third nozzle 302c remains activate, and so forth. The wide wave pattern may be implemented in connection with any of the example wave patterns or sequences disclosed herein. The mass flow from each nozzle 302a-302j can be the same or different than adjacent nozzles (e.g., by controlling the valves 604a-604j (FIG. 6)).

Figure 9:
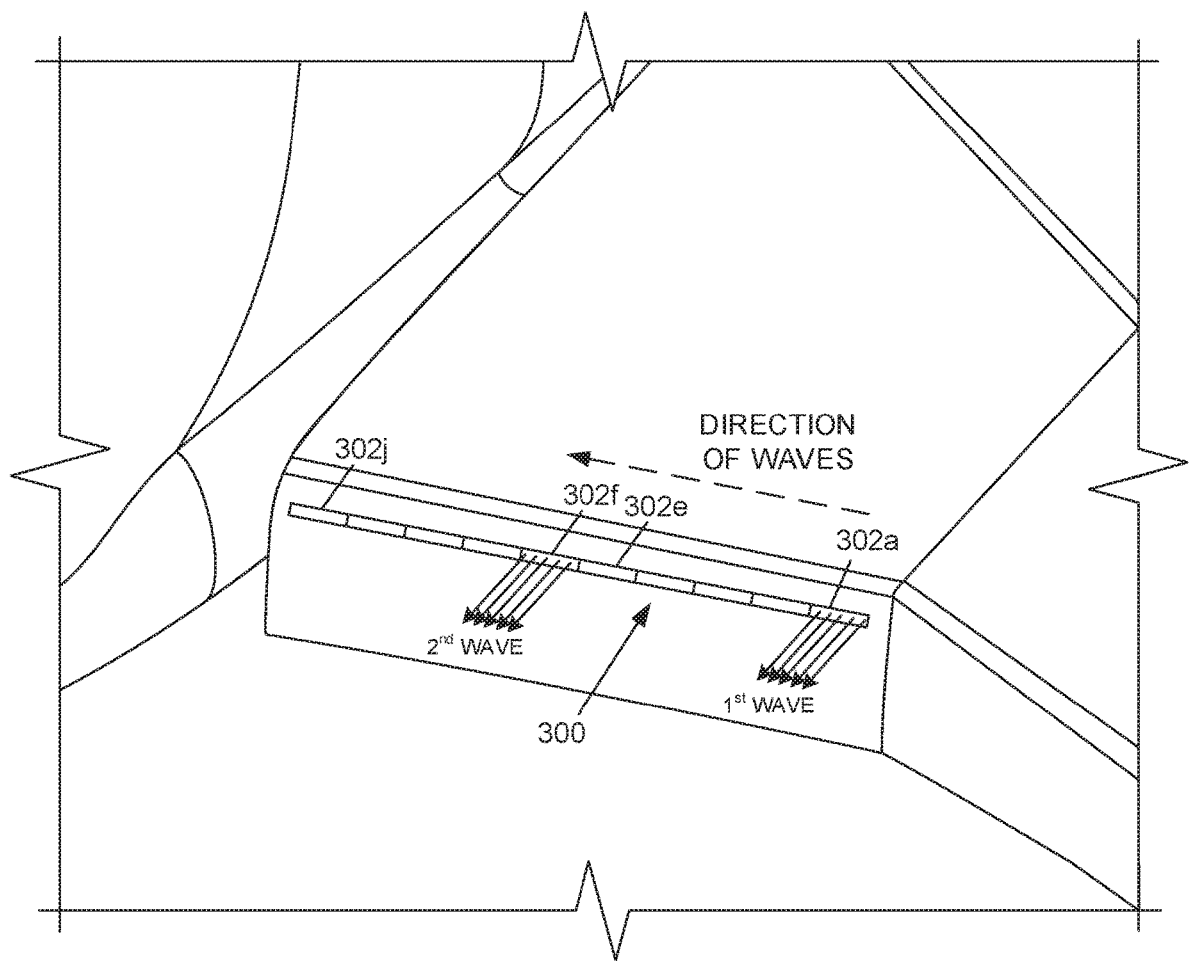
FIG. 9 illustrates an example multi-wave pattern implemented by the example active flow control system of FIG. 3.

Another example wave pattern that may be implemented by the example active flow control system 300, referred to as a multi-wave pattern, is illustrated in FIG. 9. In the illustrated example of FIG. 9, a first wave begins with the activation of the first nozzle 302a. Additionally, a second wave begins simultaneously with the activation of the sixth nozzle 302f. The first and second waves move in sequence from outboard to inboard, similar to the single narrow wave pattern disclosed in connection with FIG. 7. In some examples, when the first wave reaches the sixth 302f, a new (third) wave is started at the first nozzle 302a. This pattern continues, such that two waves are always present and evenly spaced apart from each other, moving from outboard to inboard. In other examples, the first and second waves may move from inboard to outboard direction.

Figure 10:
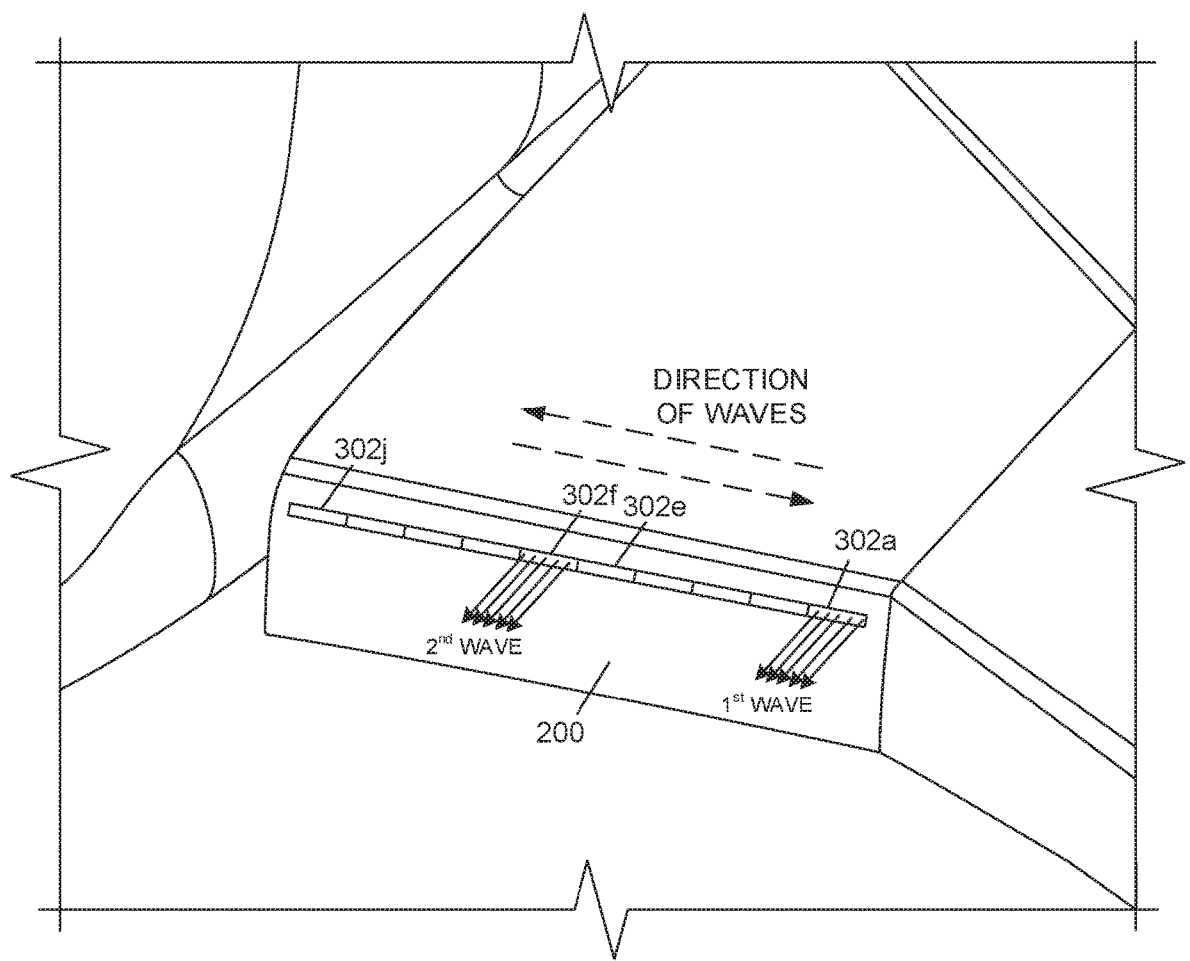
FIG. 10 illustrates another example multi-wave pattern implemented by the active flow control system of FIG. 3.

In another example wave pattern, the first and second waves may be reversed, back toward the outboard direction. For example, FIG. 10 illustrates an example where the first and second waves move back toward the outboard direction. When the first wave reaches the fifth nozzle 302e and the second wave reaches the tenth nozzle 302j, the direction of the first and second waves reverse, and the first and second waves are directed back outboard. Then, when the first wave reaches the first nozzle 302a and the second wave reaches the sixth nozzle 302f, the pattern again repeats, and the first and second waves are directed back outboard.

The first through fifth nozzles 302a-302e may be considered a first plurality of nozzles, and the sixth through tenth nozzles 302f-302j may be considered a second plurality of nozzles. The first and second plurality of nozzles are arranged in an array and disposed adjacent each other. In this example, the valve controller 602 (FIG. 6) activates the first plurality of nozzles (302a-302e) in sequence from outboard to inboard and then from inboard to outboard to create the first wave of air moving from outboard to inboard and then from inboard to outboard across the flap 200. Similarly, the valve controller 602 activates the second plurality of nozzles (302f-302j) to eject air in sequence from outboard to inboard and then from inboard to outboard to create a second wave of air moving from outboard to inboard and then from inboard to outboard across the flap 200. In this example, the valve controller 602 activates the first plurality of nozzles (302a-302e) and the second plurality of nozzles (302f-302j) such that the first and second waves of air move in the same direction inboard and outboard.

In the illustrated examples of FIGS. 9 and 10, the first and second waves are offset from each other by five nozzles. In other examples, the waves may be offset from each other by more or fewer ones of the nozzles 302a-302j. In some examples, more than two waves may be implemented. For example, four waves may be implemented, and each wave may be offset from the next wave by one or more of the nozzles 302a-302j. The waves may repeat in an inboard direction, an outboard direction, or move back-and-forth between inboard and outboard. Further, the first and second waves may be formed by activating one nozzle at a time (similar to the narrow wave pattern of FIG. 7) or multiple nozzles at a time (similar to the wide wave pattern of FIG. 8).

Figure 11:
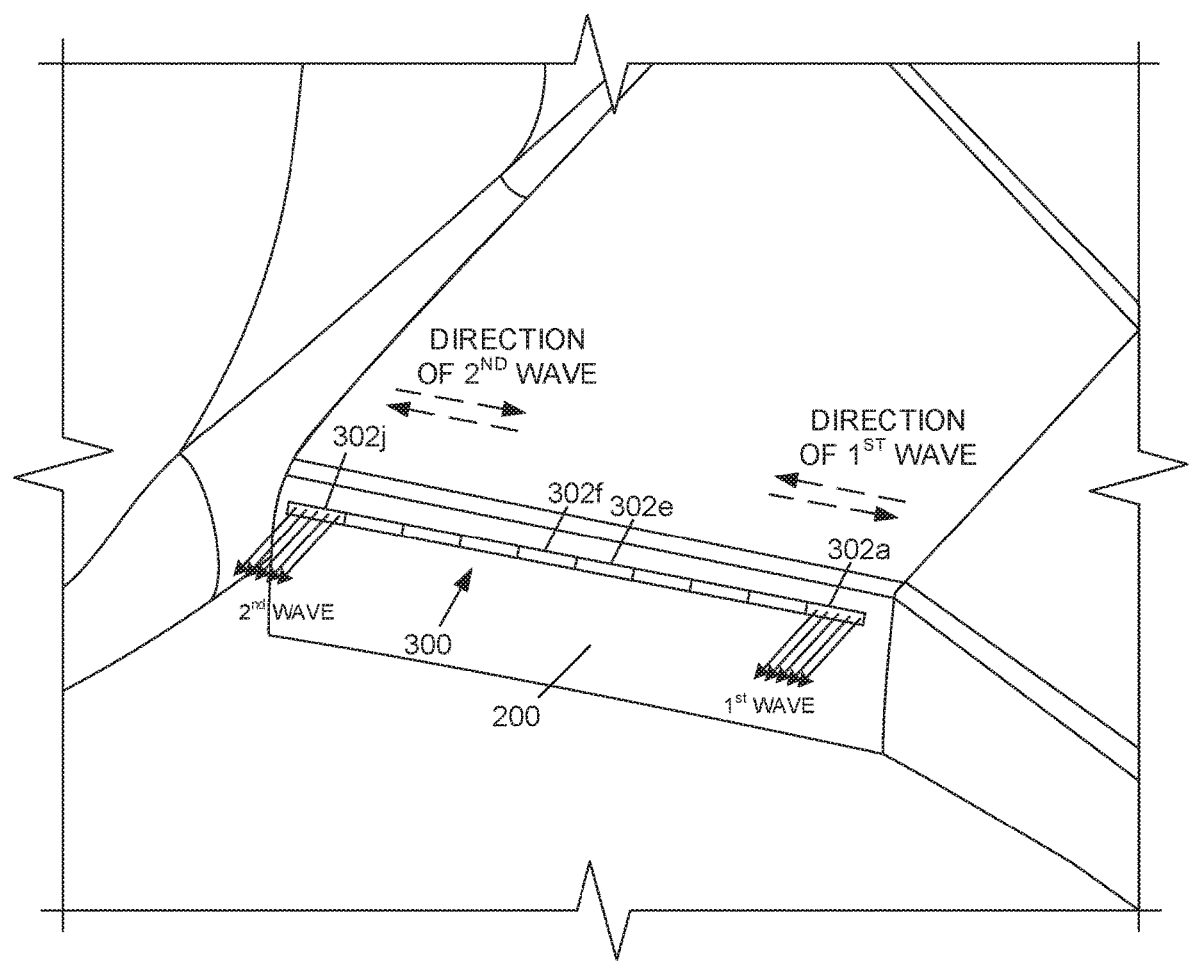
FIG. 11 illustrates another example multi-wave pattern implemented by the active flow control system of FIG. 3.

Another example multi-wave pattern that may be implement with the active flow control system 300 is illustrated in FIG. 11. In the example of FIG. 11, the first and second waves move in opposite directions. For example, a first wave begins with the activation of the first nozzle 302a. Additionally, a second wave begins simultaneously with the activation of the tenth nozzle 302j. The first wave moves from outboard to inboard, while the second wave moves from inboard to outboard. Each of the nozzles 302a-302j may be activated for substantially the same amount of time, such that the first wave and the second wave meet at the fifth and sixth nozzles 302e, 302f. When the first wave reaches the fifth nozzle 302e, and the second wave reaches the sixth nozzle 302f, the directions of the waves reverse. For example, the first wave then heads back outboard, and the second wave heads back inboard. Thus, the first and second waves move in opposite directions. Similar to above, the first through fifth nozzles 302a-302e may be considered a first plurality of nozzles, and the sixth through tenth nozzles 302f-302j may be considered a second plurality of nozzles. The valve controller 602 (FIG. 6) activates the first plurality of nozzles (302a-302e) in sequence from outboard to inboard and then from inboard to outboard to create the first wave of air moving from outboard to inboard and then from inboard to outboard across the flap 200. Similarly, the valve controller 602 (FIG. 6) activates the second plurality of nozzles (302f-302j) to eject air in sequence from outboard to inboard and then from inboard to outboard to create a second wave of air moving from outboard to inboard and then from inboard to outboard across the flap 200. In this example, the valve controller 602 activates the first plurality of nozzles (302a-302e) and the second plurality of nozzles (302f-302j) such that the first and second waves of air move in opposite directions inboard and outboard.

In another example, when the first wave reaches the fifth nozzle 302e and the second wave reaches the sixth nozzle 302f, the waves may end and new waves may begin again at the first and tenth nozzles 302a, 302j. Thus, in such an example, the waves move from the outer nozzles (the first and tenth nozzles 302a, 302j) toward the center nozzles (the fifth and sixth nozzles 302e, 302f) and then repeat. In another example, instead of moving toward the center nozzles, the waves can start at the fifth and sixth nozzles 302e, 302f and move in opposite directions. When the first wave reaches the first nozzle 302a and the second wave reaches the tenth nozzle 302j, the waves end and new waves may begin again at the fifth and sixth nozzles 302e, 302f. Thus, in such an example, the waves move from the center nozzles (the fifth and sixth nozzles 302e, 302f) toward the outer nozzles (the first and tenth nozzles 302a, 302j) and then repeat.

Thus, many different wave patterns may be implemented by the example active flow control system 300. As discussed above, the selection of a wave pattern may be based on one or more parameters of flight. In all of the example wave patterns, significantly less air is required than is required with known systems that use a constant airflow. Thus, the engine(s) of the aircraft 100 can be significantly smaller (because less bleed air is required) and/or the size and weight of the compressor(s), the pressure storage vessel(s), and/or the APU(s) can be reduced, thereby increasing the overall efficiency of the aircraft. In other words, relatively smaller compressors(s), pressure storage vessel(s), and/or APU(s) can be employed because significantly less air is required.

Figure 12:
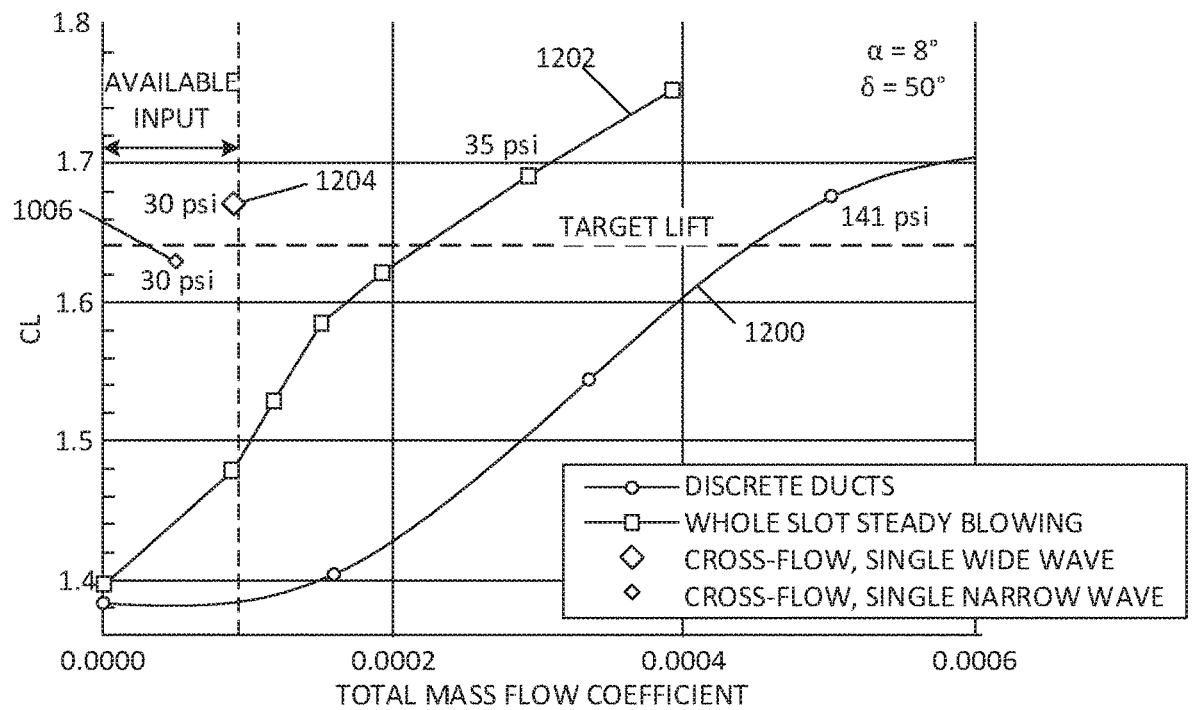
FIG. 12 illustrates a graph showing example simulation results of lift increments obtained with various actuation modes.

FIG. 12 is graph showing example simulation results of various actuation modes. The X-axis represents the total mass flow coefficient and the Y-axis represents the lift coefficient achieved. The simulation was performed for a wing at a representative landing condition with a flap deflected at 50° (δ) at Mach number 0.2 and an angle-of-attack (α) of 8°. Without any flow control, the lift coefficient for the example aircraft configuration is about 1.4. The required lift coefficient (target lift) for the example configuration is about 1.64, which is indicated by the horizontal dashed line. The amount of pressured air supply available onboard the example aircraft is denoted by the vertical dash line. A first actuation mode, represented by line 1200, was simulated (using spaced apart nozzles similar to the arrangement in FIG. 18) using a set of discrete fluidic devices placed at equal distances and blowing a constant stream of pressurized air. As illustrated, this first actuation mode results in relatively low performance and the need for relatively high pressurized air supply, which renders the actuation mode impractical for the aircraft. A second actuation mode, represented by line 1202, was simulated using a single elongated slot and a constant stream of air. This second actuation mode also produced relatively poor results and requires a relatively high pressurized air supply. A third actuation mode, represented by point 1204, was simulated using an example wide wave pattern, such as disclosed in connection with FIG. 8. As illustrated, the wide wave pattern produced acceptable lift within the available fluidic resources. Likewise, a fourth actuation mode, represented by point 1006, was performed using an example narrow wave pattern, such as disclosed in connection with FIG. 7, that also produced high lift within the available air supply limit. Additionally, with the reduction in pressure requirement, the piping system 602 can be significantly lighter than in known systems (to support the first and second actuation modes in FIG. 12), which further decreases the gross weight of the aircraft 100.

Figure 13:
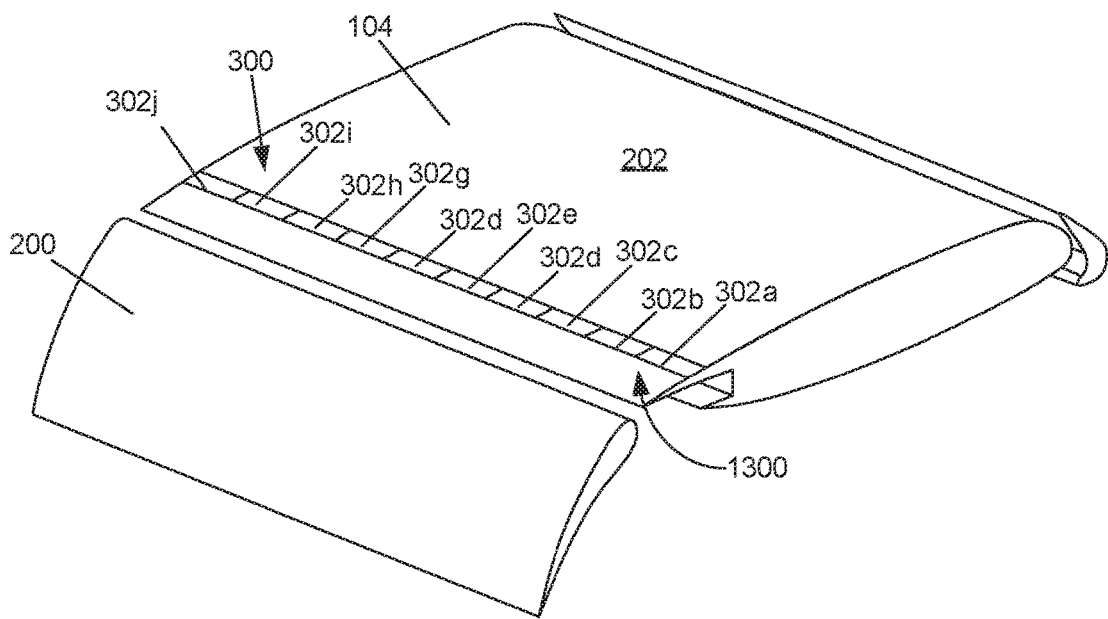
FIG. 13 illustrates the example active flow control system of FIG. 3 disposed in an alternative location.

In the illustrated example of FIG. 3, the plurality of nozzles 302a-302j are disposed within a movable control surface (i.e., the flap 200). However, in other examples, the nozzles 302a-302j may be disposed in other locations, such as a fixed surface location, to produce a similar effect. For example, as illustrated in FIG. 13, the plurality of nozzles 302a-302j are disposed in the first wing 104, fore of the flap 200. The nozzles 302a-302j are exposed via a slot 1300 in the upper surface 202 of the first wing 104. The nozzles 302a-302j may be activated and deactivated according a desired or selected wave pattern as disclosed herein to eject pressurized air in the streamwise direction, similar to the example implementation in FIG. 3. In other examples, the nozzles 302a-302j may be disposed in other locations. For example, the nozzles may be disposed between the flap 200 and the first wing 104, and the nozzles 302a-302j may be deployed or extended rearward when the flap 200 is deployed.

Figure 14:
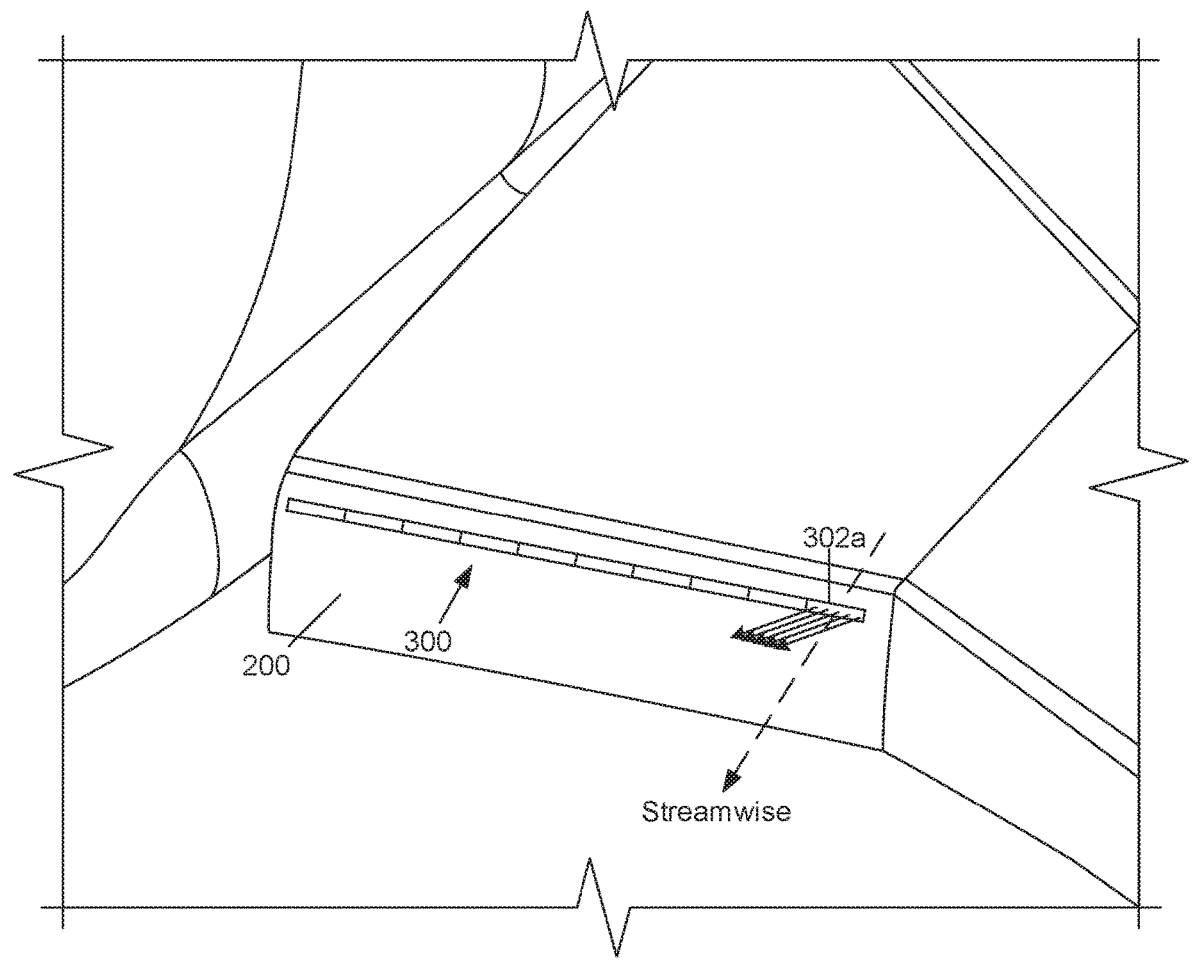
FIG. 14 illustrates an example in which the example nozzles of the example active flow control system of FIG. 3 eject air in an angled direction relative to the streamwise direction.

In the illustrated example of FIGS. 7-10 the nozzles 302a-302j of the example flow control system 300 are positioned or oriented in the streamwise or substantially streamwise direction, such that air is ejected in the streamwise direction. In other examples, the nozzles 302a-302j of the example flow control system 300 can be configured or shaped to eject air in an angled direction with respect to the streamwise direction. For example, FIG. 14 illustrates an example in which the nozzles 302a-302j (only the first nozzle 302a is referenced in FIG. 14) of the active flow control system 300 are configured to eject pressurized air in a direction that is angled with respect to the streamwise direction. As shown in FIG. 14, the air ejected from the first nozzle 302a is angled inboard relative to the streamwise direction. In other examples, the first nozzle 302a can be positioned such that air ejected from the first nozzle 302a is angled outboard relative to the streamwise direction. The other nozzles 302b-302j may be configured to eject air at the same angle as the first nozzle 302a.

Figure 15:
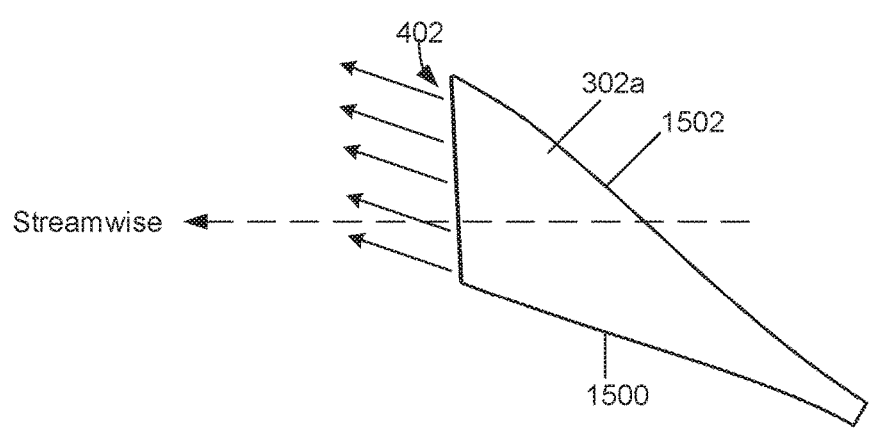
FIG. 15 is a top view of an example nozzle from FIG. 14 configured to eject air in an angled direction relative to the streamwise direction.

FIG. 15 is a top view of the first nozzle 302a from FIG. 14. As shown in FIG. 15, the first nozzle 302a has a first side 1500 and a second side 1502. The second side 1502 is longer than the first side 1500. This shape enables the outlet 402 to remain oriented spanwise across the flap 200 (FIG. 14) while ejecting air at an angled direction. As shown, the pressurized air exiting the outlet 402 is angled relative to the streamwise direction. The first nozzle 302a can be shaped to eject air at any angle relative to the streamwise direction (e.g., 10°, 20°, etc.). The other nozzles 302b-302j may be similarly shaped. In some examples, all of the nozzles 302a-302j are configured to eject air at the same angle. In other examples, one or more of the nozzles 302a-302j may be configured to eject air at different angles. In some examples, the nozzles 302a-302j are fixedly installed in the flap 200, such that the air ejected from the nozzles 302a-302j is always in the same direction. In other examples, an actuating mechanism (e.g., an actuator with levers) may be used to move the nozzles 302a-302j to change the direction of the exit air. Any of the example wave patterns or sequences disclosed herein may be implemented in connection with the active flow control system 300 of FIG. 14 having angled ejection streams.

In some examples, the mass flow and exit velocity of each of the nozzles 302a-302j is the same when the respective nozzles 302a-302 are activated. For example, when activating each of the nozzles 302a-302j, each of the valves 604a-604j is opened the same amount, such that the mass flow and the velocity (and, thus, the momentum) of the air ejected from each of the nozzles 302a-302j is the same. Momentum is defined by the mass flow X velocity of the jet. In other examples, the mass flow and/or the exit velocity of each of the nozzles 302a-302j may be independently controllable. For example, the exit velocity may be varied with the wave pattern in the spanwise direction. In particular, the exit velocity of each of the nozzles 302a-302j can be controlled such that the exit velocity of each of the nozzles changes in the spanwise direction. For example, with the single wave pattern in FIG. 7, the first nozzle 302a may be activated to eject air at a first velocity, the second nozzle 302b may be activated to eject air at a second velocity, different from the first velocity, and so forth. Therefore, the size or speed of the wave created by the wave pattern may change in the spanwise direction. In some examples, the exit velocities of the nozzles 302a-302j increase or decrease as the wave of air moves from inboard to outboard or outboard to inboard. For example, the exit velocities of the nozzles 302a-302j may be controlled such that the exit velocities increase from outboard to inboard as the wave of moving air moves outboard to inboard. This enables the exit velocities to be more proportional to the airflow at the local wing chord. For example, if the air flowing over the wing at a particular location is faster the air flowing over the wing at another location, the exit velocities of the nozzles at those locations can be increased or decreased according to the air speed and/or pressure. This may be beneficial with certain shaped wings, such as swept wing, wherein the airflow varies significantly across the wing span. Additionally or alternatively, the exit velocity of a nozzle may be change while the nozzle is activate. For example, while the first nozzle 302a is activated (e.g., for 1 second), the velocity may be increased or decreased. The control system 610 (FIG. 6) may determine the desired exit velocities for the individual nozzles 302a-302j based on the plenum pressure, speed of the airflow along the corresponding surface, and/or one or more other flight parameters. As such, the exit velocities can be changed during different flight segments, such as takeoff, climb, approach, and landing. In some examples, the nozzles 302a-302j may be activated to produce supersonic jets for maximum benefit.

In some examples, to control the exit velocities of the nozzles 302a-302j, the valve controller 602 controls the individual valves 604a-604j based on the desired exit velocity. For example, the first valve 604a may be fully opened to eject air from the first nozzle 302a at a first velocity or may be partially opened to eject air from the first nozzle 302a at a second velocity, which is less than the first velocity. The other valves 604b-604j may be similarly varied to control the exit velocities of the respective nozzles 302b-302j.

Figure 16:
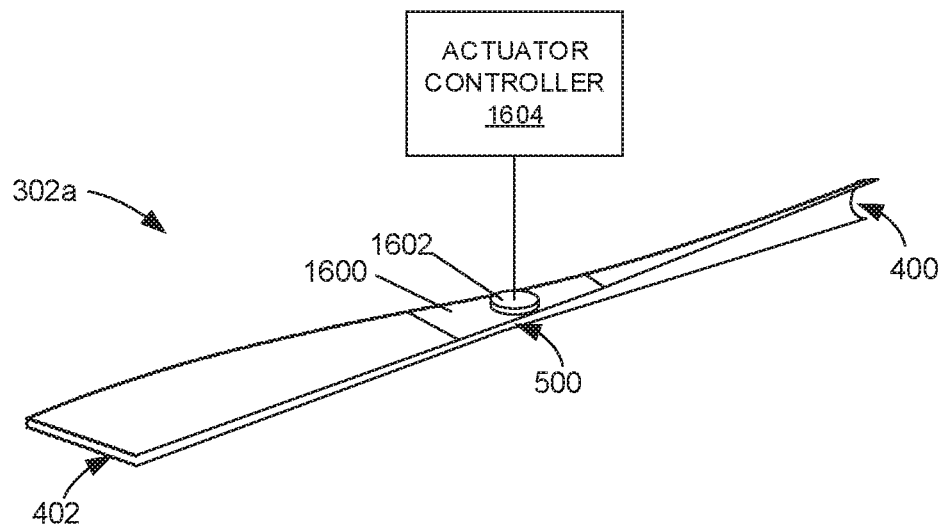
FIG. 16 is a cross-sectioned view of an example nozzle having a variable throat area that may be implemented in connection with the example active flow control system of FIG. 3.

In other examples, in addition to or as an alternative to controlling the valves 604a-604j to affect the exit velocities, the shapes of the nozzles 302a-302j may be modified to affect the exit velocities of the respective nozzles 302a-302j. For example, FIG. 16 is a cross-sectioned view of the first nozzle 302a. As disclosed above, the first nozzle 302a has an inlet 400, a throat 500, and an outlet 402. The velocity of the air exiting the outlet 402 is based on a ratio defined as $A_{inlet}/A_{throat}$, where $A_{inlet}$ is the area of the inlet 400 and $A_{throat}$ is the area of the throat 500. These areas can be modified to affect the exit velocity. For example, in FIG. 16, a portion 1600 of the first nozzle 302a defining the throat 500 is constructed of a flexible material (e.g., an elastomer, a flexible membrane, a diaphragm), such as materials with rubber-like properties. The active flow control system 300 includes an actuator 1602 that is operatively coupled to the portion 1600 of the first nozzle 302a. The actuator 1602 can be coupled directly to the portion 1600 or can be coupled via a system of intermediary components (e.g., levers, links, etc.) to the portion 1600. The actuator 1602 is controlled by an actuator controller 1604, which can be implemented by the control system 610 of FIG. 6. The actuator 1600 may be actuated (via a control signal from the actuator controller 1604) to apply pressure to or relieve pressure from the portion 1600, thereby changing the cross-sectional area of the throat 500 and, thus, affecting the exit velocity of the pressurized air exiting the first nozzle 302a. Additionally or alternatively, an actuator can be provided to change the cross-sectional area of the inlet 400, which also affects the exit velocity at the outlet 402. The other nozzles 302b-302j (FIGS. 3 and 6) may similarly include one or more actuators for changing the exit velocities of the respective nozzles 302b-302j. The actuators may be actuated independently (via the actuator controller 1604), such that the exit velocity of each nozzle 302a-302j can be independently controlled.

Figure 17:
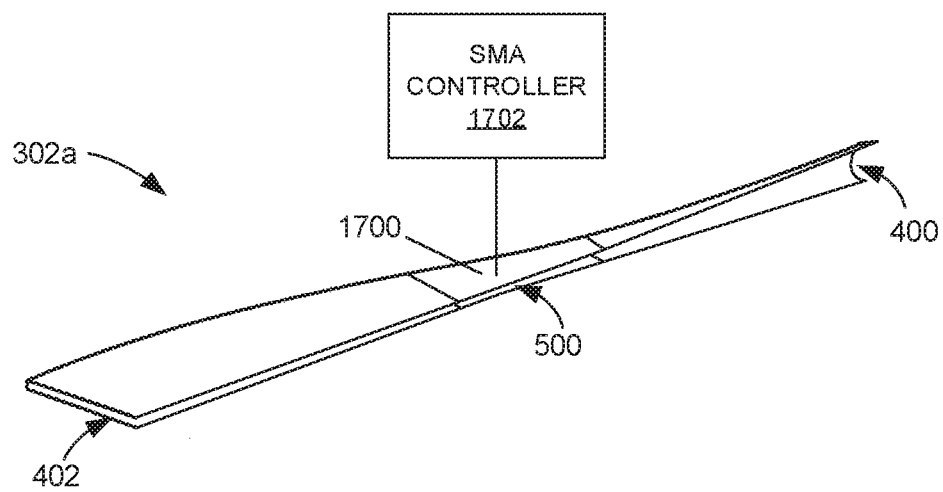
FIG. 17 is a cross-sectioned view of another example nozzle having a variable throat area that may be implemented in connection with the example active flow control system of FIG. 3.

FIG. 17 is a cross-sectioned view of the first nozzle 302a. In this example, a portion 1700 of the first nozzle 302 defining the throat 500 is constructed of a shape memory alloy (SMA) (sometimes referred to as a smart memory alloy). When an activation signal is applied to the SMA, the SMA exhibits a reversible change in dimension or shape. The activation signal may be a heat signal or a voltage. The activation signal is applied by an SMA controller 1702, which can be implemented by the control system 610 of FIG. 6. When the activation signal is applied to the SMA, the portion 1700 of the first nozzle 302a contracts or constricts, thereby reducing the cross-sectional area of the throat 500 and, thus, changing the exit velocity at the outlet 402. In other examples, the portion 1700 may be constructed of another type of active material, such as an electroactive polymer. In some examples, when the activation signal is ceased (e.g., when the SMA is deactivated), the property of the SMA reverts to an unpowered form and returns substantially to its original shape, thereby enlarging the area of the throat 500. In other examples, a return mechanism (e.g., a spring) is provided to return the SMA to its original shape. In some examples, in addition to or as an alternative to utilizing SMA in the portion 1500, the portion of the first nozzle 302a defining the inlet 400 may be constructed of an SMA, such that that the area of the inlet 400 can be similarly changed to affect the exit velocity. The other nozzles 302b-302j (FIGS. 3 and 6) may similarly include SMAs for changing the exit velocities of the respective nozzles 302b-302j. The SMAs may be activated independently (via the SMA controller 1600), such that the exit velocity of each nozzle 302a-302j can be independently controlled.

While in some of the illustrated examples the nozzles 302a-302j are disposed immediately adjacent one another, in other examples, one or more of the nozzles 302a-302j can be spaced apart from each other along the corresponding surface. For example, FIG. 18 illustrates an example in which the nozzles 302a-302j (only the first, second, third, and tenth nozzles 302a, 302b, 302c, 302j are referenced in FIG. 18) of the example active flow control system 300 are spaced apart from each other along the flap 200. The nozzles 302a-302j may be spaced apart from each by any distance (e.g., one inch, two inches, three inches, etc.). The nozzles 302a-302j may be spaced evenly from each other such that the distance between a nozzle and an adjacent nozzle is the same. In other examples, the spacing may be different between different ones of the nozzles 302a-302j. For example, the first nozzle 302a may be spaced apart from the second nozzle 302b by a first distance, and the second nozzle 302b may be spaced apart from the third nozzle 302c by a second distance different than the first distance. Additionally or alternatively, the sizes (e.g., the widths) of the nozzles 302a-30j may be varied.

Figure 19:
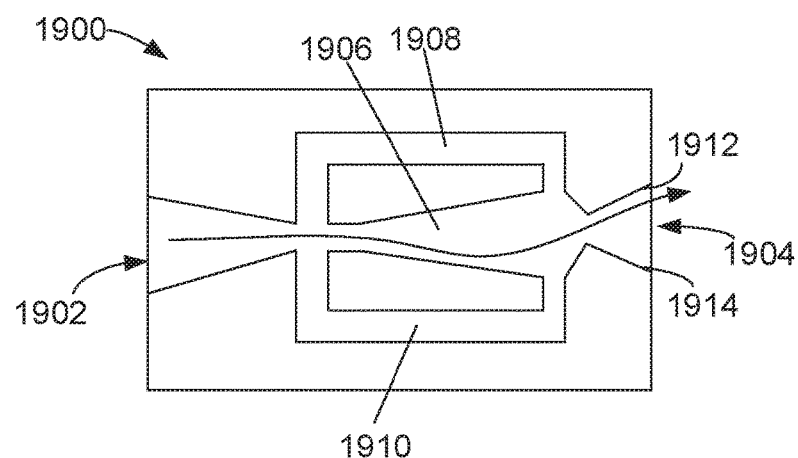
FIG. 19 is a schematic of an example fluidic oscillator that may be implemented as one or more of the nozzles of the example active flow control system of FIG. 3.

As disclosed herein, in some examples, the nozzles 302a-302j are implemented as converging-diverging nozzles. In other examples, other types of nozzles or ejectors may be utilized. For example, FIG. 19 is a schematic of an example fluidic oscillator 1900 (sometimes referred to as a sweeping jet actuator) that may be utilized in any of the examples disclosed herein. The fluidic oscillator 1900 includes an inlet 1902 that receives high pressure fluid, such as from the air source 600 (FIG. 6), an outlet 1904, a pathway 1906 between the inlet 1902 and the outlet 1904, and two feedback pathways 1908, 1910. The high pressure fluid is ejected in a stream (as shown by the arrow) from the outlet 1904 that oscillates back-and-forth in a sweeping fashion between a first side 1912 and a second side 1914 of the outlet 1904. The fluidic oscillator 1900 operates without any moving parts. Various parameters of the fluidic oscillator 1900 may be tuned to produce a stream that oscillates at a particular frequency. Any of the example nozzles 302a-302j disclosed in connection with any of the example systems, wave patterns, arrangements, etc. disclosed herein may be implemented as a fluidic oscillator. For example, one or more of the nozzles 302a-302j shown in FIG. 6 may be implement as fluidic oscillators. The fluidic oscillators may be activated by opening the respective valves 604a-604j. In still other examples, the nozzles 302a-302j may be implemented as other types of nozzles or ejectors and/or controlled via other mechanisms (e.g., piezoelectric jet actuators).

Although ten nozzles are described in connection with the illustrated examples, it is understood that the example active flow control system 300 may be employ more or fewer nozzles (e.g., three nozzles, fifty nozzles, etc.). Further, while the example active flow control system 300 is described in connection with the flap 200, the example active flow control system 300 can be similarly implemented in connection with any other movable control surface such as an aileron, an elevator, a slat, a rudder, a spoiler and/or any other control surface on a leading edge, a trailing edge, or between a leading edge and a trailing edge. For example, the example active control system 300 may be implemented in connection with a leading edge slat. In such an example, the nozzles are oriented to direct air in the streamwise or rear direction. In other examples, the active flow control system 300 can be implemented in other locations, such as on fixed or non-movable surfaces. For example, the active flow control system 300 may be implemented above or upstream a front windshield of the fuselage 102 to decrease airflow separation directly behind or upstream of the front windshield. The active flow control system 300 can also be implemented on a tail of the aircraft 100, on an engine cowl (e.g., adjacent an inlet nozzle, adjacent an exhaust nozzle), on landing gear doors, and/or any other exposed surface or location on the aircraft 100. Multiple active flow control systems can be implemented on a same surface (e.g., on the flap 200). For example, a first active flow control system with a first plurality of nozzles and a second active flow control system with a second plurality of nozzles may be implemented on the same surface (e.g., arranged spanwise relative to each other). Further, while the example active flow control system 300 is illustrated in connection with a fixed wing aircraft, the example active flow control system 300 can be similarly implemented on other types of aircraft, such as rotorcraft (e.g., a helicopter, a quadcopter, etc.), manned aircraft, unmanned aircraft (drones), etc., as well as on other types of vehicles (e.g., an automobile, a submersible, etc.), to improve fluid (e.g., air, water, etc.) flow around the respective surfaces.

While an example manner of implementing the control system 610 is illustrated in FIG. 6, one or more of the elements, processes and/or devices illustrated in FIG. 6 may be combined, divided, re-arranged, omitted, eliminated and/or implemented in any other way. Further, the example valve controller 606, the example wave pattern selector 612, the example wave pattern database 614, the example actuator controller 1604 (FIG. 16), the example SMA controller 1702 (FIG. 17), and/or, more generally, the example control system 610 of FIG. 6 may be implemented by hardware, software, firmware and/or any combination of hardware, software and/or firmware. Thus, for example, any of the example valve controller 606, the example wave pattern selector 612, the example wave pattern database 614, the example actuator controller 1604 (FIG. 16), the example SMA controller 1702 (FIG. 17), and/or, more generally, the example control system 610 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example valve controller 606, the example wave pattern selector 612, the example wave pattern database 614, the example actuator controller 1604 (FIG. 16), and/or the example SMA controller 1702 (FIG. 17) is/are hereby expressly defined to include a non-transitory computer readable storage device or storage disk such as a memory, a digital versatile disk (DVD), a compact disk (CD), a Blu-ray disk, etc. storing the software and/or firmware. Further still, the example control system 610 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 20:
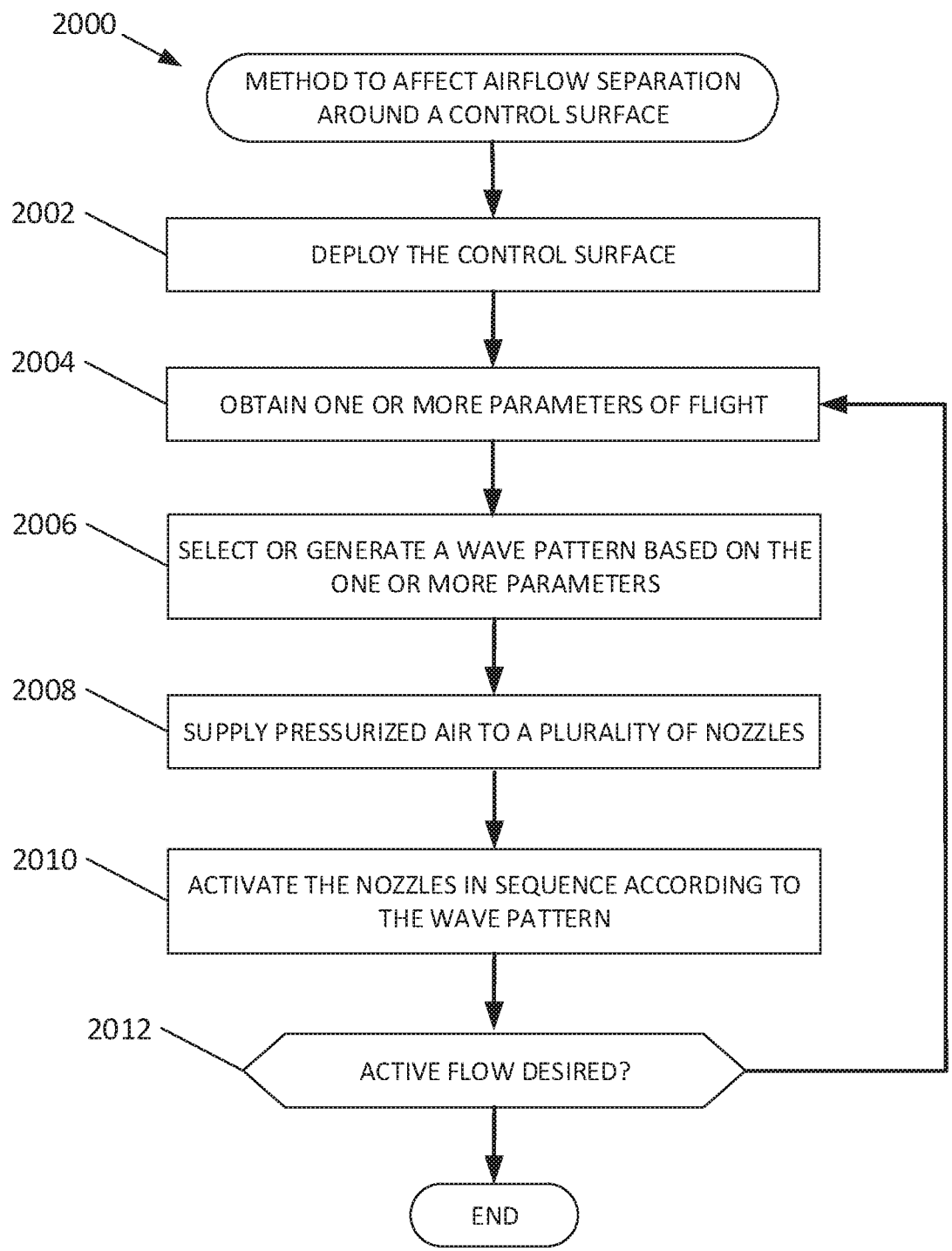
FIG. 20 is a flowchart representative of an example method implemented by the example active flow control system of FIG. 3.

A flowchart representative of an example method for implementing the control system 610 of FIG. 6 is shown in FIG. 20. In this example, the method may be implemented by machine readable instructions that comprise a program for execution by a processor such as the processor 2112 shown in the example processor platform 2100 discussed below in connection with FIG. 21. The program may be embodied in software stored on a non-transitory computer readable storage medium such as a CD-ROM, a floppy disk, a hard drive, a digital versatile disk (DVD), a Blu-ray disk, or a memory associated with the processor 2112, but the entire program and/or parts thereof could alternatively be executed by a device other than the processor 2112 and/or embodied in firmware or dedicated hardware. Further, although the example program is described with reference to the flowchart illustrated in FIG. 20, many other methods of implementing the example control system 610 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example method of FIG. 20 may be implemented using executable instructions (e.g., computer and/or machine readable instructions) stored on a non-transitory computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 20 is a flowchart representative of an example method 2000 to affect airflow separation as implemented by the example active flow control system 300 of FIG. 6. The example method 2000 may be implemented, at least in part, as machine readable instructions executed by the control system 610.

In some examples, the active flow control system 300 is deployed on a movable control surface, such as the flap 200. In such an example, at block 2002, the example method 2000 includes deploying the control surface. For example, as illustrated in FIGS. 2 and 3, the flap 200 is movable between a stowed position (FIG. 2) and a deployed position (FIG. 3). The nozzles 302a-302j are arranged in an array across the flap 200. In some examples, the nozzles 302a-302j are disposed in the control surface. In other examples, the nozzles 302a-302j are disposed in the wing, adjacent the control surface, or in an area between the wing and the control surface. In still other examples, the nozzles 302a-302j may be disposed on another surface of the aircraft 100, such as on the fuselage 102 above the windshield, on a cowl of an engine, on a landing gear door, and/or any other exposed surface or location of the aircraft 100.

At block 2004, the example wave pattern selector 612 obtains (e.g., measures) one or more parameters of flight. The one or more parameters may include, for example, an ambient air temperature, an altitude of the aircraft 100, a ground speed of the aircraft 100, a relative airspeed of the aircraft 100, an angle or position of the associated control surface (e.g., the flap 200), a weather condition, a stage of flight (e.g., taxi, takeoff, climb, cruise, landing, etc.), and/or any other flight setting or control surface setting. Additionally or alternatively, one of the parameters may include a measurement from one or more separation sensors that provide(s) an indication of flow separation. Example separation sensors include a skin-friction indicator (e.g., a Preston-tube miniature surface-to-pressure probe) or a flush surface static-pressure orifice.

At block 2006, the wave pattern selector 612 selects a wave pattern based on the one or more parameters. In some examples, a plurality of wave patterns are stored in the wave pattern database 614. Additionally or alternatively, in some examples the wave pattern selector 612 generates or creates a wave pattern based on the one or more parameters. The selected (or generated) wave pattern may include, for example, a narrow wave pattern (e.g., as disclosed in connection with FIG. 7), a wide wave pattern (e.g., as disclosed in connection with FIG. 8), a multi-wave pattern (e.g., as disclosed in connection with FIGS. 9-11) and/or any other wave pattern. The wave pattern may not only include a specific sequence of activation, but may include specific exit velocities for each of the nozzles 302a-302j. For example, a wave pattern may be selected where the exit velocities of the nozzles 302a-302j increase from outboard to inboard.

At block 2008, the example method 2000 includes supplying pressurized air to the nozzles 302a-302j. The air source 600 of FIG. 6 may be, for example, bleed air from the engine(s) of the aircraft 100, from a compressor, from a pressure storage vessel (e.g., an air tank), from an APU, and/or from any other source of pressurized air available on the aircraft 100. At block 2010, the valve controller 606 activates the nozzles 302a-302j (by activating the valves 604a-604j) in sequence according to the wave pattern. The activation includes activating and deactivating the nozzles 302a-302j, simultaneously or individually. For example, to implement a narrow wave pattern, as disclosed in connection with FIG. 7, the nozzles 302a-302j are activated one at a time, in sequence, for a period of time. In some examples, multiple ones of the nozzles 302a-302j may be activated or deactivated, such as in the multi-wave pattern disclosed in connection with FIGS. 9-11. The nozzles 302a-302j are activated in succession or series to form one or more waves of air moving in the spanwise direction. The example wave pattern may be repeated until deactivated or until the control surface is no longer used, at which point all of the nozzles 302a-302j may be deactivated. In some examples, the control system 610 also controls the exit velocities of the nozzles 302a-302j. The control system 602 may control the exit velocities by controlling the valves 604a-604. Additionally or alternatively, the control system 610 may change the throat and/or inlet areas of the nozzles 302a-302j (e.g., via the actuator 1602 of FIG. 16, via the SMA of FIG. 17, etc.).

At block 2012, the control system 610 checks whether the active flow control system 300 is still desired. For example, it may be desired to only use active flow control during a certain segment of flight, or only during flight (but not while on the ground). If active flow control is still desired, the example method continues to block 2004 and the example wave pattern selector 612 obtains (e.g., measures) the current parameter(s) of flight. If the flight parameter(s) has/have changed, a new pattern may be selected and implemented. In some examples, the control system 610 checks the flight parameter(s) at a set frequency (e.g., every 10 seconds, every minute, every five minutes). Therefore, during a first time period or segment of flight, a first type of wave pattern (e.g., a single narrow wave pattern) may be utilized, and during a second time period or segment of flight, a second type of wave pattern (e.g., a multi-wave pattern) may be utilized. The control system 610 may switch wave patterns based on changing flight parameters and/or control surface deflections to achieve optimal flow control. Otherwise, if the control system 610 determines active flow is not desired (e.g., the aircraft is at the gate, a pilot has turned off the active flow, etc.), the example method 2000 ends.

Figure 21:
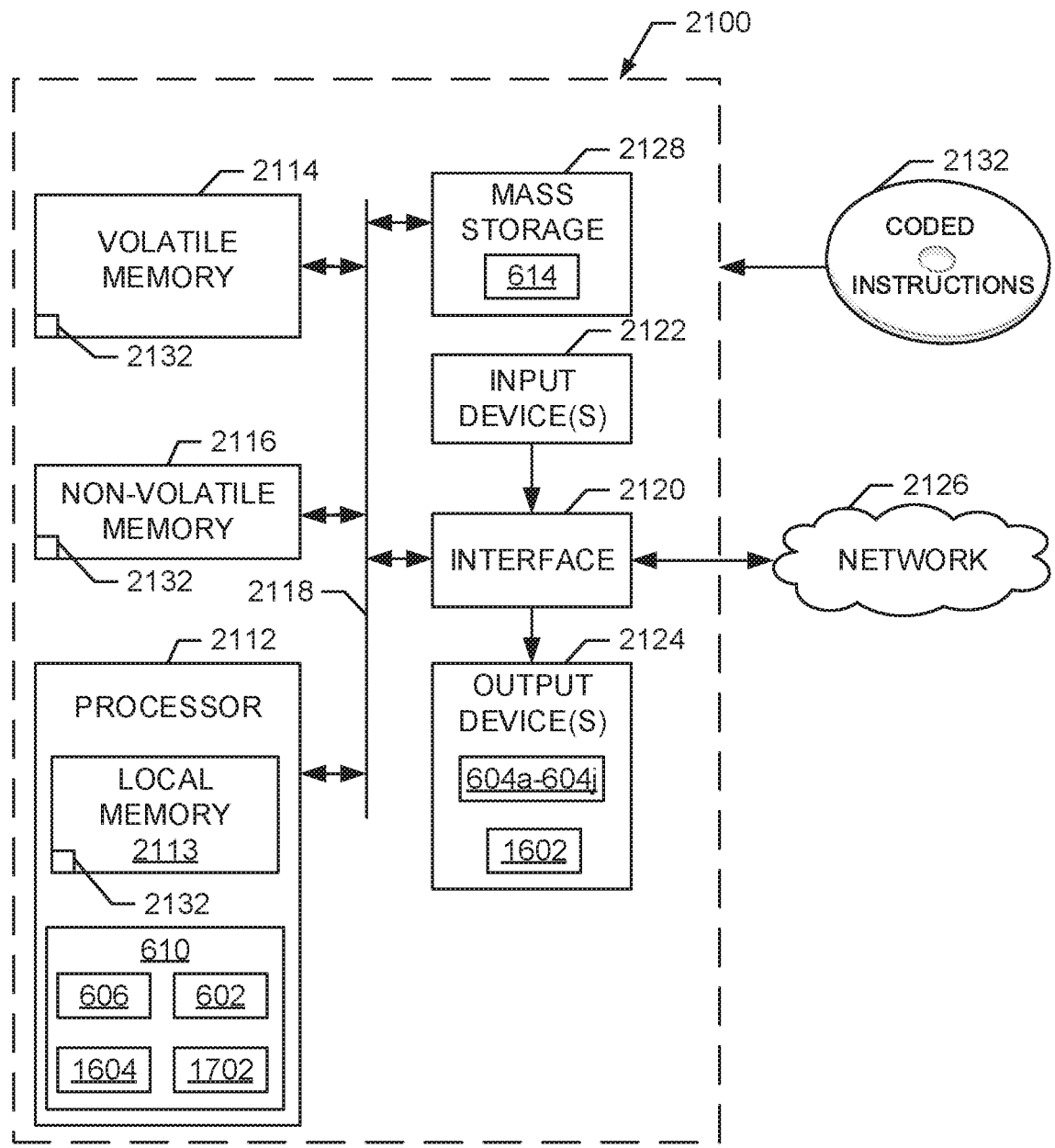
FIG. 21 is a block diagram of an example processor system structured to execute example machine readable instructions represented at least in part by FIG. 20 to implement the example active flow control system of FIG. 3.

FIG. 21 is a block diagram of an example processor platform 2100 capable of executing the method of FIG. 20 to implement the example control system 610 of FIG. 6. The processor platform 2100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2112 implements the example valve controller 606, the example wave pattern selector 612, the example actuator controller 1604, and/or the SMA controller 1702 of the control system 610.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller. The processor platform 2100 of the illustrated example also includes an interface circuit 2120. The interface circuit 2120 may be implemented by any type of interface standard, such as an Ethernet interface, a universal serial bus (USB), a Bluetooth® interface, a near field communication (NFC) interface, and/or a PCI express interface.

In the illustrated example, one or more input devices 2122 are connected to the interface circuit 2120. The input device(s) 1322 permit(s) a user and/or a device (e.g., a sensor, such as a temperature sensor, a pressure sensor, a wind speed sensor, a separation sensor, etc.) to enter data and commands into the processor 2112. The input device(s) 2122 can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 may include, for example, the valves 604a-604j (FIG. 6), the actuator(s) 1602 (FIG. 16), the SMA material (FIG. 17), etc. Additionally or alternatively, the output devices 2124 can be implemented, for example, by display devices (e.g., a light emitting diode (LED), an organic light emitting diode (OLED), a liquid crystal display, a cathode ray tube display (CRT), an in-place switching (IPS) display, a touchscreen, etc.), a tactile output device, a printer and/or a speaker. The interface circuit 2120 of the illustrated example, thus, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.). The communication can be via, for example, an Ethernet connection, a digital subscriber line (DSL) connection, a telephone line connection, a coaxial cable system, a satellite system, a line-of-site wireless system, a cellular telephone system, etc.

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and digital versatile disk (DVD) drives. The mass storage 2128 may include the wave pattern database 614, for example.

Machine executable instructions 2132 to implement the method 2000 of FIG. 20 may be stored in the mass storage device 2128, in the volatile memory 2114, in the non-volatile memory 2116, and/or on a removable non-transitory computer readable storage medium such as a CD or DVD.

From the foregoing, it will be appreciated that the above disclosed methods, systems/apparatus and articles of manufacture may be used to affect airflow separation around a surface, such as a movable control surface of an aircraft. The disclosed examples employ a plurality of nozzles that impart momentum into the airflow around a control surface to reattach the airflow and increase lift. This streamlining effect generates greater global circulation, leading to lift augmentation of the control surface, while the amount of actuation required to create such augmentation is greatly reduced. As a result, significantly less air supply is required, which reduces the overall energy needs of the aircraft and weight of the aircraft. Thus, the aircraft may achieve better fuel efficiency.

Although certain example methods, apparatus/systems and articles of manufacture have been disclosed herein, the scope of coverage of this patent is not limited thereto. On the contrary, this patent covers all methods, apparatus/systems and articles of manufacture fairly falling within the scope of the claims of this patent.

What is claimed is:

1. An active flow control system comprising:
   a plurality of nozzles arranged in an array across a surface of an aircraft, the nozzles oriented to eject air across the surface to reduce airflow separation;
   an air source coupled to the nozzles, and
   a controller to activate the nozzles to eject air from the air source in sequence from outboard to inboard and then from inboard to outboard to create a wave of air moving from outboard to inboard and then from inboard to outboard across the surface.

2. The active flow control system of claim 1, wherein the plurality of nozzles are a first plurality of nozzles and the wave of air is a first wave of air, further including a second plurality of nozzles arranged in an array across the surface and disposed adjacent the first plurality of nozzles.

3. The active flow control system of claim 2, wherein the controller is to activate the second plurality of nozzles to eject air from the air source in sequence from outboard to inboard and then from inboard to outboard to create a second wave of air moving from outboard to inboard and then from inboard to outboard across the surface.

4. The active flow control system of claim 3, wherein the controller activates the first plurality of nozzles and the second plurality of nozzles such that the first and second waves of air move in a same direction inboard and outboard.

5. The active flow control system of claim 3, wherein the controller activates the first plurality of nozzles and the second plurality of nozzles such that the first and second waves of air move in opposite directions inboard and outboard.

6. The active flow control system of claim 1, wherein the nozzles are oriented to eject air in a substantially streamwise direction.

7. The active flow control system of claim 1, wherein at least one of the nozzles is shaped to eject air at an angled direction relative to a streamwise direction.

8. The active flow control system of claim 1, wherein the air source is from at least one of bleed air from an engine of the aircraft, an auxiliary power unit, a pressure storage vessel, or a compressor.

9. The active flow control system of claim 1, wherein the surface is a movable flight control surface including at least one of a flap, an aileron, a slat, a rudder, an elevator, or a spoiler.

10. The active flow control system of claim 1, wherein the aircraft is a fixed wing aircraft.

11. A method comprising:
    supplying pressurized air to a plurality of nozzles, the nozzles arranged in an array across a surface of an aircraft, the nozzles oriented to eject air across the surface to reduce airflow separation, and
    activating the nozzles to eject the pressurized air in sequence from outboard to inboard and then from inboard to outboard to create a wave of air that moves from outboard to inboard and then from inboard to outboard across the surface.

12. The method of claim 11, wherein the plurality of nozzles are a first plurality of nozzles and the wave of air is a first wave of air, further including supplying the pressurized air to a second plurality of nozzles arranged an array across the surface and disposed adjacent the first plurality of nozzles.

13. The method of claim 12, further including activating the second plurality of nozzles to eject air in sequence from outboard to inboard and then from inboard to outboard to create a second wave of air moving from outboard to inboard and then from inboard to outboard across the surface such that the first and second waves of air move in a same direction inboard and outboard.

14. The method of claim 12, further including activating the second plurality of nozzles to eject air in sequence from outboard to inboard and then from inboard to outboard to create a second wave of air moving from outboard to inboard and then from inboard to outboard across the surface such that the first and second waves of air move in opposite directions inboard and outboard.

15. An active flow control system comprising:
a plurality of nozzles arranged in an array across a surface of an aircraft, the nozzles oriented to eject air in a substantially streamwise direction;
an air source coupled to the nozzles; and
a control system to:
activate the nozzles to eject air from the air source in sequence to create a wave of air moving across the surface; and
control an exit velocity of each of the nozzles such that the exit velocities of the nozzles are different.

16. The active flow control system of claim 15, wherein a first nozzle of the plurality of nozzles is a converging-diverging nozzle having a throat.

17. The active flow control system of claim 16, wherein a portion of the first nozzle defining the throat is constructed of a flexible material.

18. The active flow control system of claim 17, further including an actuator operatively coupled to the portion of the first nozzle defining the throat, wherein the control system is to activate the actuator to apply pressure to or relieve pressure from the portion to change an area of the throat and affect an exit velocity of the first nozzle.

19. The active flow control system of claim 16, wherein a portion of the first nozzle defining the throat is constructed of a shape memory alloy, wherein the control system is to activate the shape memory alloy to change an area of the throat and affect an exit velocity of the first nozzle.

20. The active flow control system of claim 15, wherein the control system is to control the exit velocities of the nozzles such that the exit velocities increase from outboard to inboard as the wave of moving air moves from outboard to inboard.

* * * * *